United States Patent
Beauchesne-Martel et al.

(10) Patent No.: US 12,410,757 B2
(45) Date of Patent: Sep. 9, 2025

(54) SYSTEM AND METHOD OF OPERATING MULTI-ENGINE SYSTEM

(71) Applicant: PRATT & WHITNEY CANADA CORP., Longueuil (CA)

(72) Inventors: Philippe Beauchesne-Martel, Brossard (CA); Gaetan De Lussy, Montréal (CA); Jeremie Hebert, Napierville (CA); Daniel Coutu, Longueuil (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 162 days.

(21) Appl. No.: 17/540,570

(22) Filed: Dec. 2, 2021

(65) Prior Publication Data

US 2023/0175437 A1  Jun. 8, 2023

(51) Int. Cl.
*F02C 6/20* (2006.01)
*B64C 27/12* (2006.01)
*B64D 27/10* (2006.01)
*B64D 31/00* (2006.01)
*F02C 6/02* (2006.01)

(52) U.S. Cl.
CPC ............... *F02C 6/20* (2013.01); *B64C 27/12* (2013.01); *B64D 27/10* (2013.01); *B64D 31/00* (2013.01); *F02C 6/02* (2013.01)

(58) Field of Classification Search
None
See application file for complete search history.

(56) References Cited

U.S. PATENT DOCUMENTS

| | | | |
|---|---|---|---|
| 5,403,155 A | 4/1995 | Head et al. | |
| 10,328,799 B2* | 6/2019 | Duong | F16H 61/66259 |
| 11,391,203 B2* | 7/2022 | Lafargue | F02C 6/02 |
| 2013/0199198 A1 | 8/2013 | Corpron | |
| 2017/0096233 A1 | 4/2017 | Mercier et al. | |
| 2018/0187604 A1 | 7/2018 | Poumarede et al. | |
| 2018/0223740 A1* | 8/2018 | Forest | F02C 7/268 |
| 2020/0217253 A1 | 7/2020 | King | |
| 2020/0346748 A1 | 11/2020 | Riverin et al. | |
| 2020/0361620 A1* | 11/2020 | Beauchesne-Martel | B64C 27/57 |
| 2020/0385133 A1 | 12/2020 | Ruhan | |
| 2020/0408148 A1 | 12/2020 | Beauchesne-Martel et al. | |
| 2021/0061451 A1* | 3/2021 | Gons | F02C 9/44 |

* cited by examiner

*Primary Examiner* — Gerald L Sung
*Assistant Examiner* — Jacek Lisowski
(74) *Attorney, Agent, or Firm* — NORTON ROSE FULBRIGHT CANADA LLP

(57) ABSTRACT

There is described a method of operating a multi-engine system of an helicopter. The multi-engine system has a first turboshaft engine having a first shaft, a second turboshaft engine having a second shaft, a gearbox having a clutch system, and a range of rotation speeds defined as a placarded zone. The method generally has: rotating the first and second shafts at a first idle rotation speed below the placarded zone when clutched to a load; increasing a rotation speed of the first shaft from the first idle rotation speed to a flight rotation speed above the placarded zone; unclutching the second shaft from the load during the increasing; and increasing a rotation speed of the second shaft to a second idle rotation speed when the second shaft is unclutched from the load, the second idle rotation speed above the placarded zone and below the flight rotation speed.

19 Claims, 13 Drawing Sheets

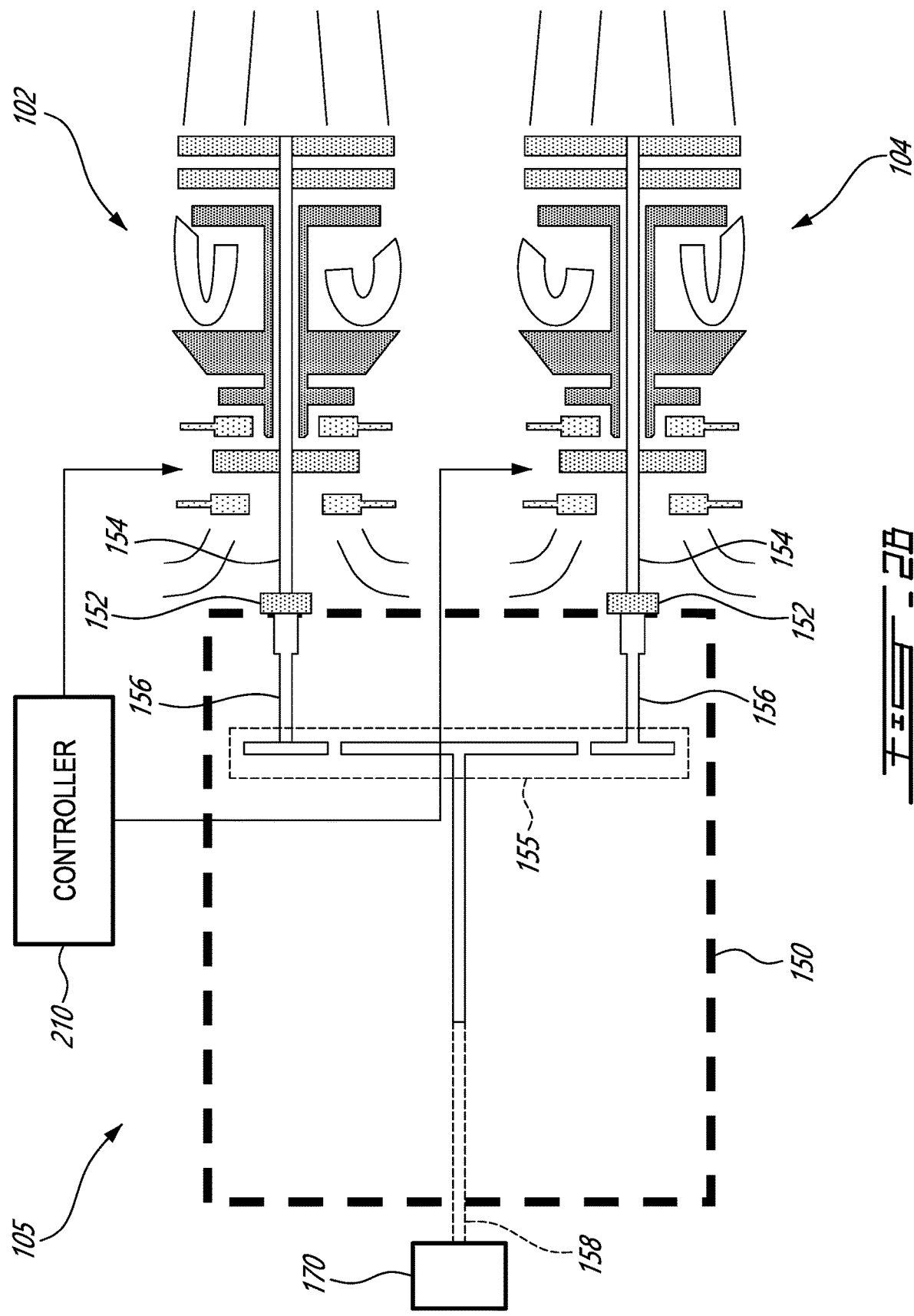

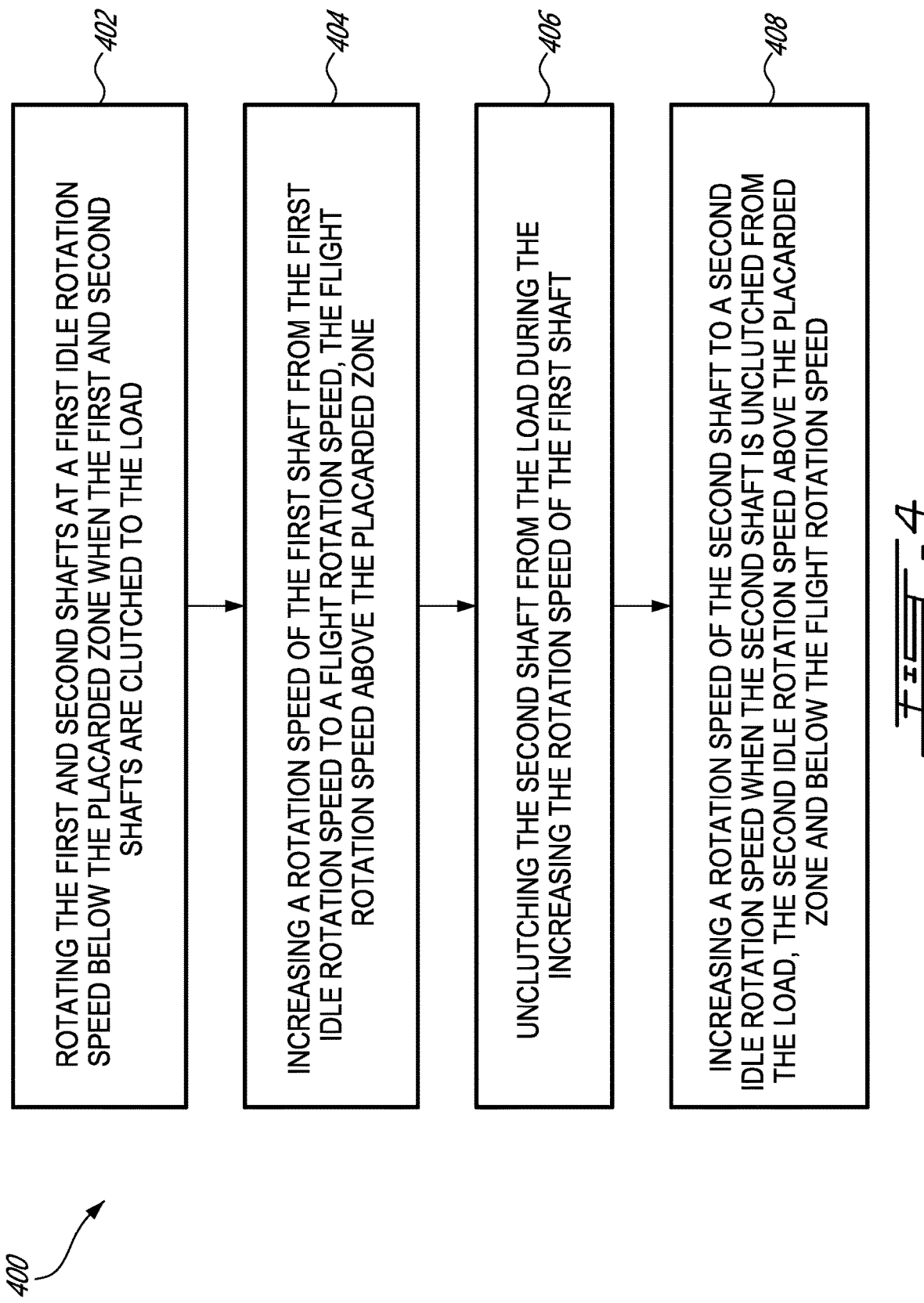

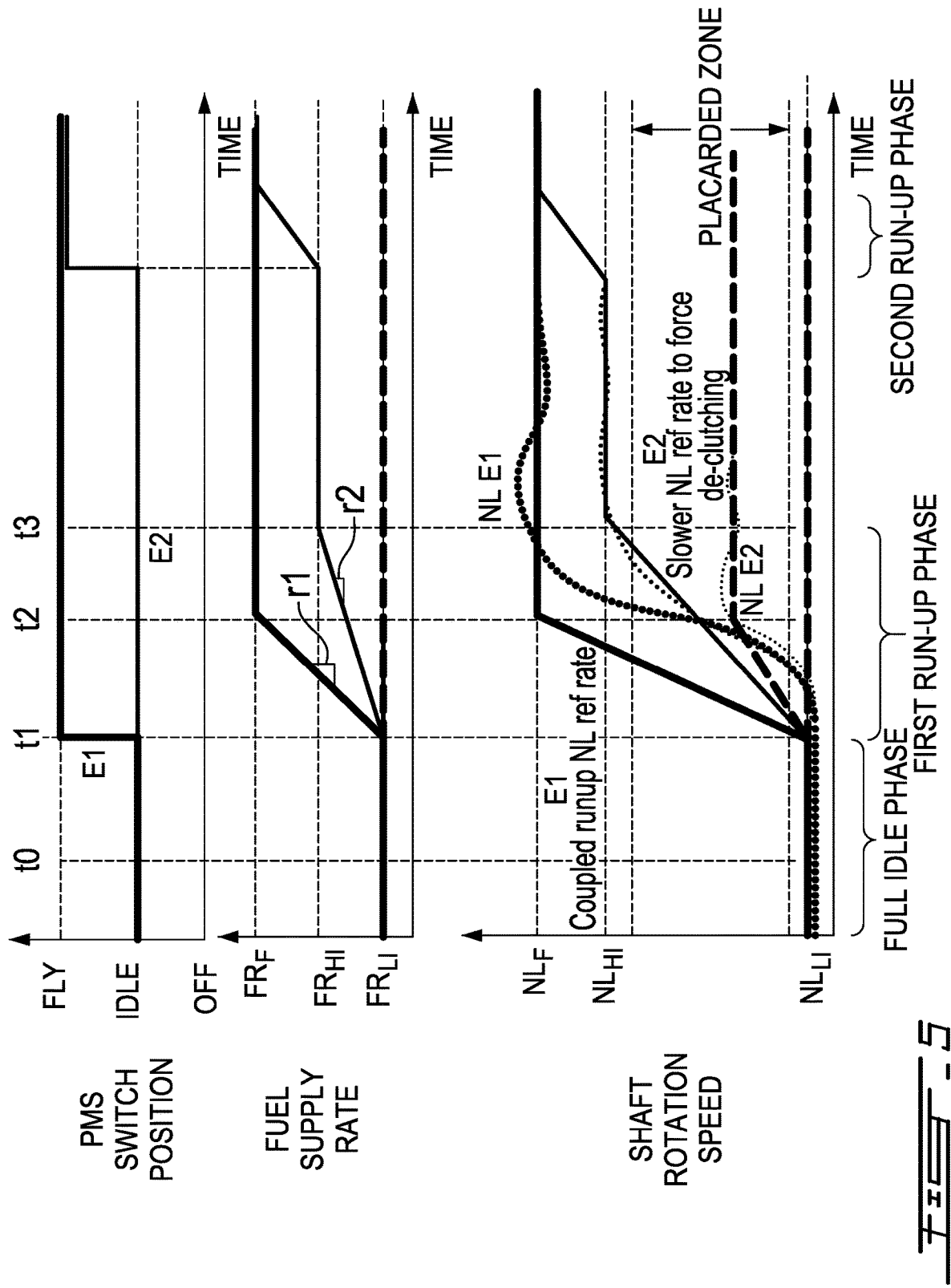

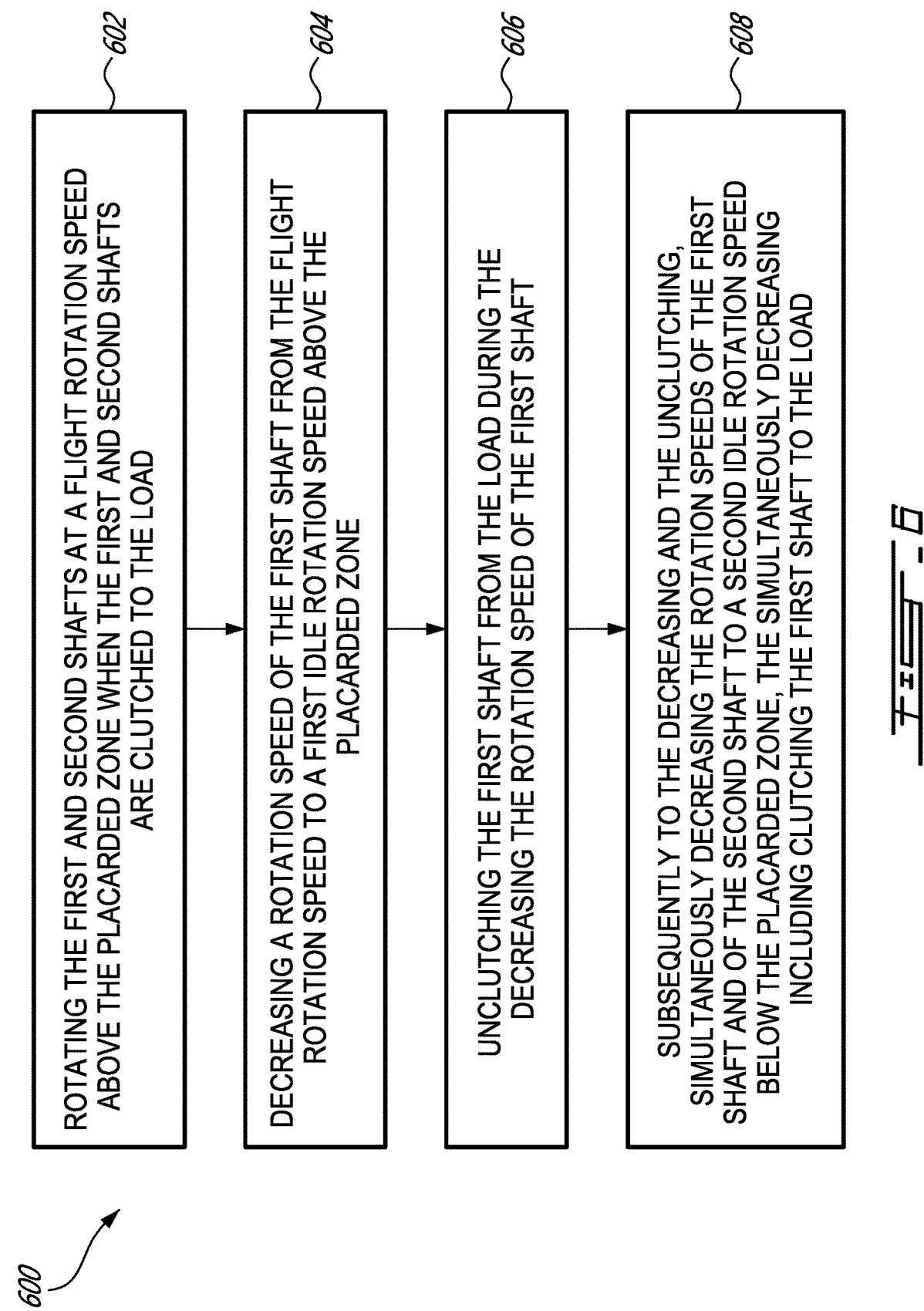

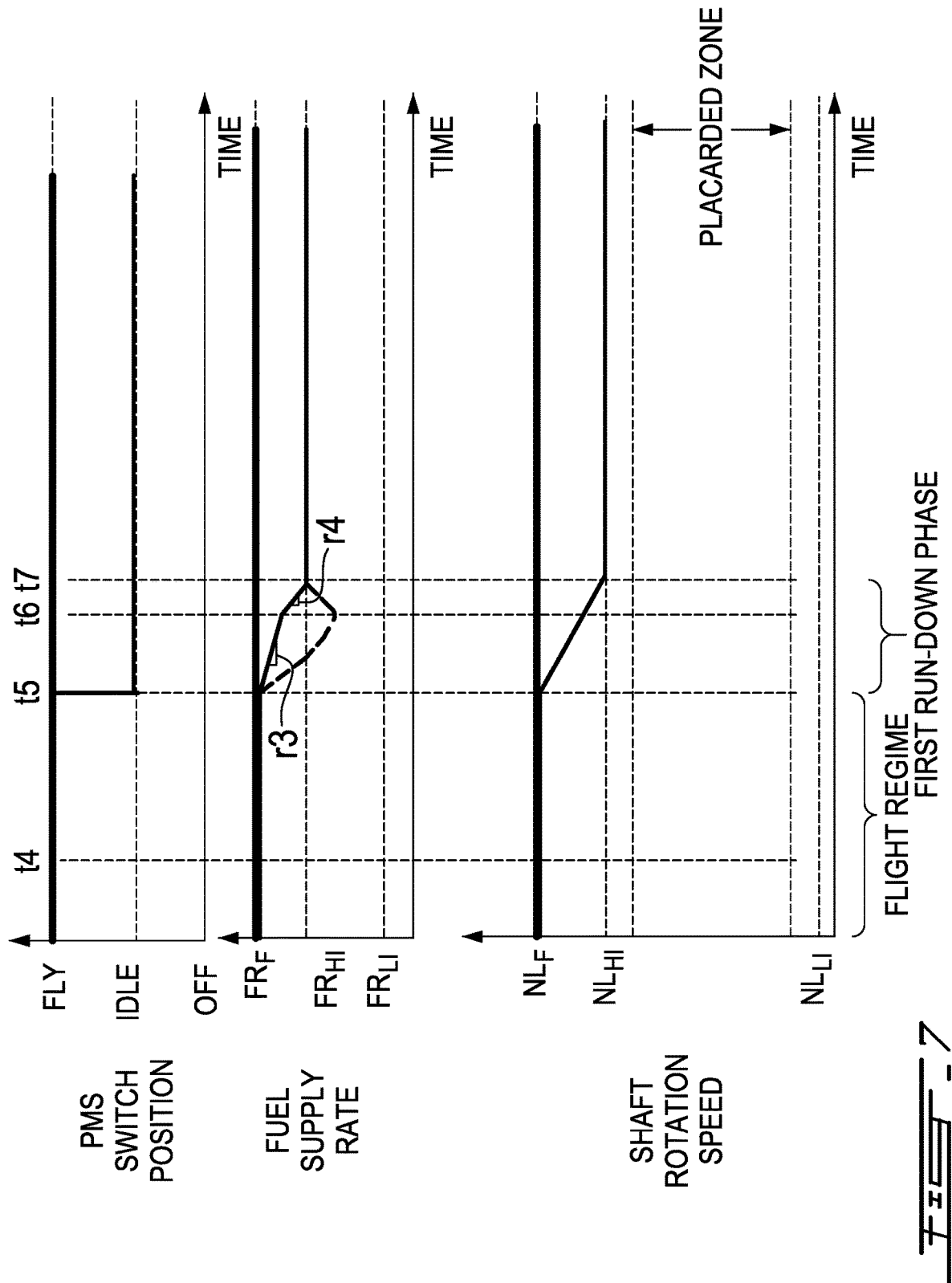

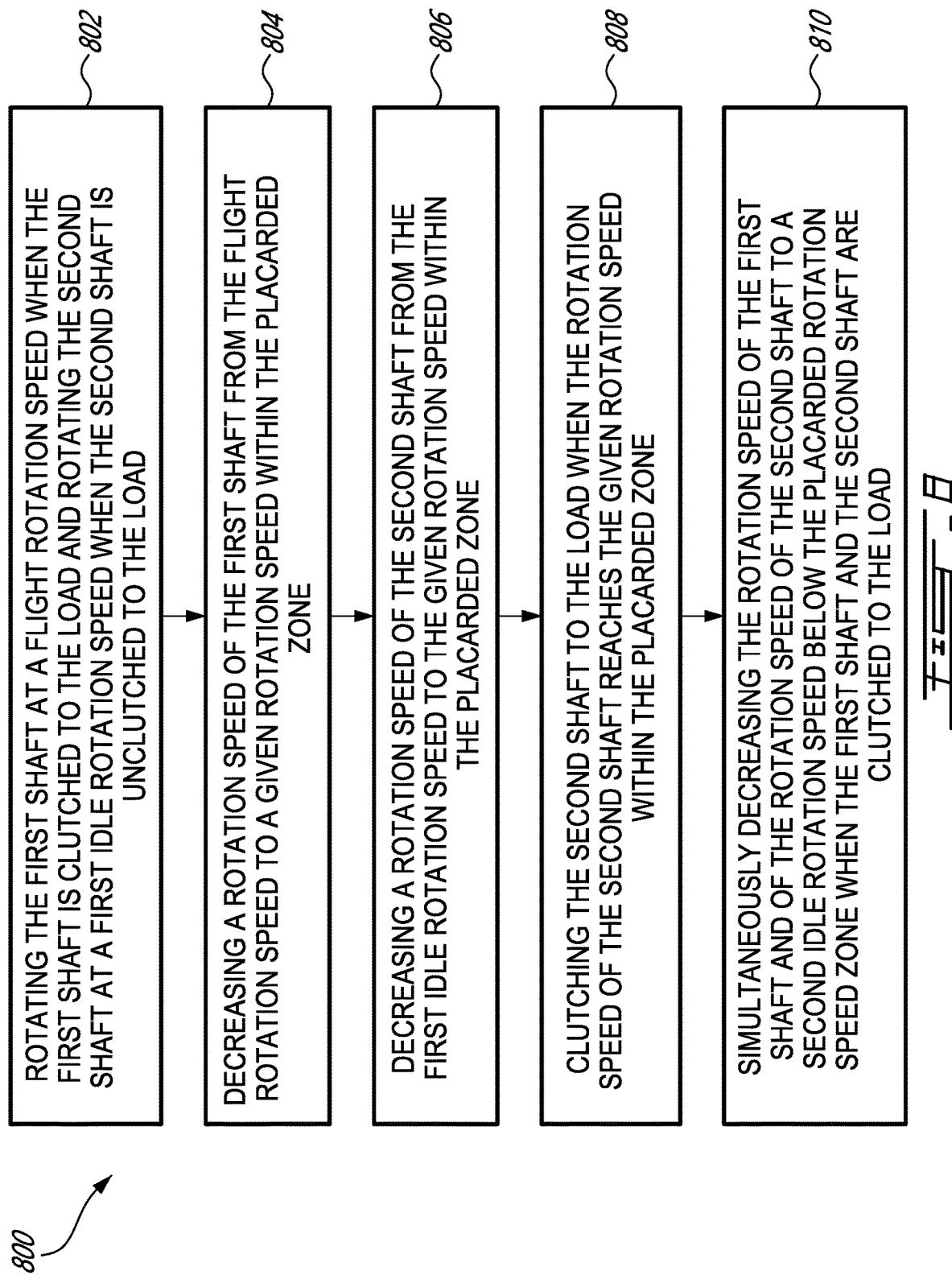

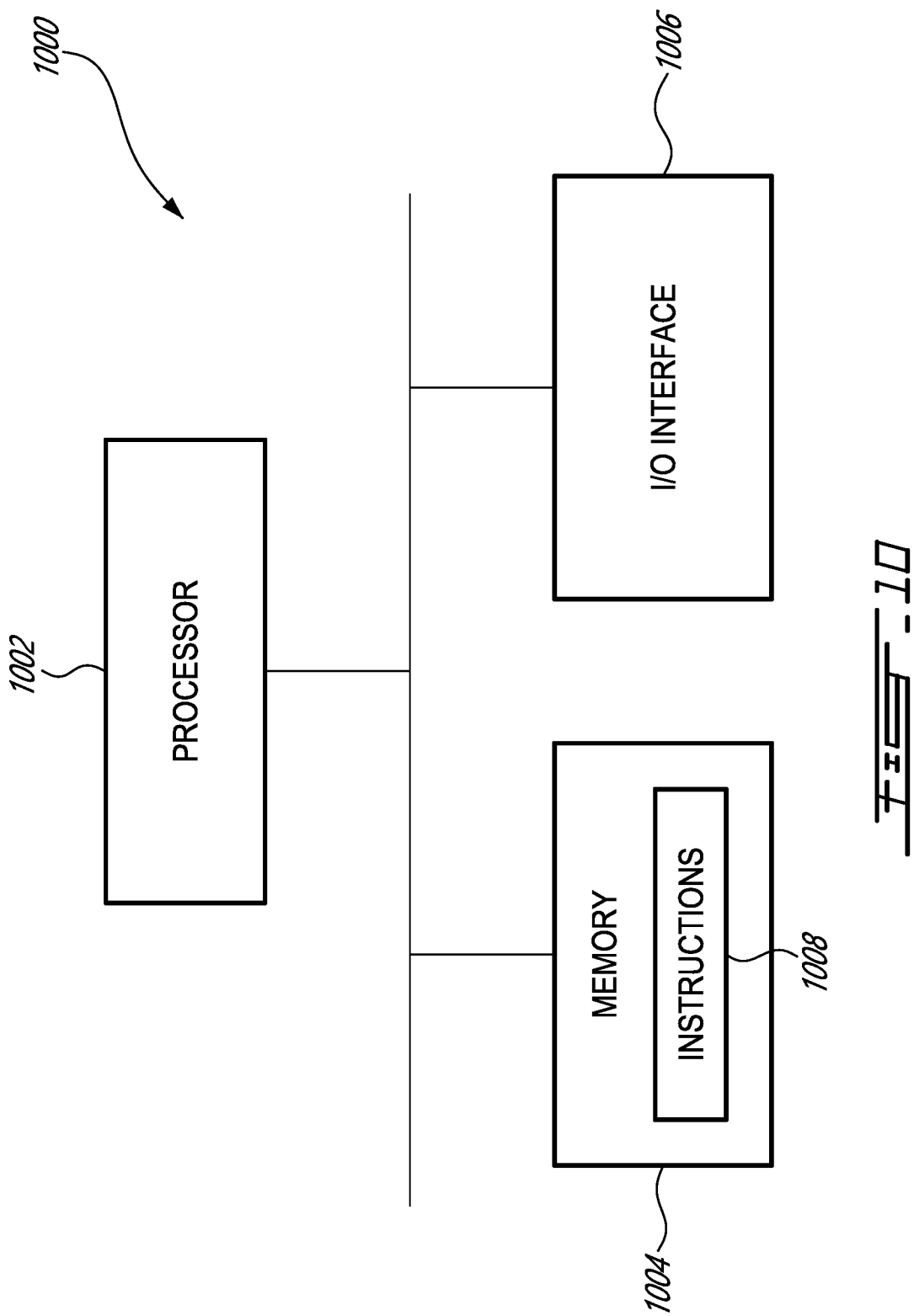

SYSTEM AND METHOD OF OPERATING MULTI-ENGINE SYSTEM

TECHNICAL FIELD

The present disclosure generally relates to multi-engine systems for aircraft and more particularly to methods and systems of operating such systems.

BACKGROUND OF THE ART

Helicopters are often provided with at least two turboshaft engines. Typically, the turboshaft engines are coupled to a main rotor via a common reduction gearbox having a clutch system. The turboshaft engines may have undesirable dynamic vibrations modes that can be excited when a shaft rotates at speeds within a range of rotation speeds referred to as a placarded zone. In some embodiments, helicopters are provided with dedicated systems for decelerating a given one of the turboshaft engines when it's shaft is unclutched from the main rotor and free to rotate at rotation speeds within the placarded zone. For instance, in some of these dedicated systems, vanes within the given turboshaft engine are actuated from a low resistance position to a high resistance position thereby decelerating the rotation speed of the shaft below the placarded zone, thereby avoiding unwanted vibrations. Although existing systems for decelerating turboshaft engines below the placarded zone are satisfactory to a certain degree, there remains room for improvement.

SUMMARY

In one aspect, there is provided a method of operating a multi-engine system of an helicopter, the multi-engine system having a first turboshaft engine having a first shaft, a second turboshaft engine having a second shaft, and a gearbox having a clutch system clutching at least one of the first shaft and the second shaft to a load of the helicopter, the first and second shafts having a range of rotation speeds defined as a placarded zone, the method comprising: rotating the first and second shafts at a first idle rotation speed below the placarded zone when the first and second shafts are clutched to the load; increasing a rotation speed of the first shaft from the first idle rotation speed to a flight rotation speed, the flight rotation speed above the placarded zone; unclutching the second shaft from the load during the increasing the rotation speed of the first shaft; and increasing a rotation speed of the second shaft to a second idle rotation speed when the second shaft is unclutched from the load, the second idle rotation speed above the placarded zone and below the flight rotation speed.

In another aspect, there is provided a system for operating a multi-engine system of an helicopter, the multi-engine system having a first turboshaft engine having a first shaft, a second turboshaft engine having a second shaft, and a gearbox having a clutch system clutching at least one of the first shaft and the second shaft to a common load of the helicopter, the first and second shafts having a range of rotation speeds defined as a placarded zone, the system comprising: a processing unit; and a non-transitory storage medium having stored thereon program code executable by the processing unit for: rotating the first and second shafts at a first idle rotation speed below the placarded zone when the first and second shafts are clutched to the load; increasing a rotation speed of the first shaft from the first idle rotation speed to a flight rotation speed above the placarded zone; unclutching the second shaft from the load during the increasing the rotation speed of the first shaft; and increasing a rotation speed of the second shaft to a second idle rotation speed when the second shaft is unclutched from the load, the second idle rotation speed above the placarded zone and below the flight rotation speed.

In a further aspect, there is provided a method of operating a multi-engine system, the multi-engine system having a first engine having a first shaft, a second engine having a second shaft, and a gearbox having a clutch system clutching at least one of the first shaft and the second shaft to a load, the first and second shafts having a range of rotation speeds defined as a placarded zone, the method comprising: rotating the first and second shafts at a first idle rotation speed below the placarded zone when the first and second shafts are clutched to the load; increasing a rotation speed of the first shaft from the first idle rotation speed to a flight rotation speed above the placarded zone; unclutching the second shaft from the load during said increasing the rotation speed of the first shaft; and increasing a rotation speed of the second shaft to a second idle rotation speed when the second shaft is unclutched from the load, the second idle rotation speed above the placarded zone and below the flight rotation speed.

In a further aspect, there is provided a method of operating a multi-engine system of an helicopter, the multi-engine system having a first turboshaft engine having a first shaft, a second turboshaft engine having a second shaft, and a gearbox having a clutch system clutching at least one of the first shaft and the second shaft to a load of the helicopter, the first and second shafts having a range of rotation speeds defined as a placarded zone, the method comprising: rotating the first and second shafts at a flight rotation speed above the placarded zone when the first and second shafts are clutched to the load; decreasing a rotation speed of the first shaft from the flight rotation speed to a first idle rotation speed above the placarded zone; unclutching the first shaft from the load during the decreasing the rotation speed of the first shaft; and subsequently to the decreasing and the unclutching, simultaneously decreasing the rotation speeds of the first shaft and of the second shaft to a second idle rotation speed below the placarded zone, the simultaneously decreasing including clutching the first shaft to the load.

In a further aspect, there is provided a system for operating a multi-engine system of an helicopter, the multi-engine system having a first turboshaft engine having a first shaft, a second turboshaft engine having a second shaft, and a gearbox having a clutch system clutching at least one of the first shaft and the second shaft to a load of the helicopter, the first and second shafts having a range of rotation speeds defined as a placarded zone, the system comprising: a processing unit; and a non-transitory storage medium having stored thereon program code executable by the processing unit for: rotating the first and second shafts at a flight rotation speed above the placarded zone when the first and second shafts are clutched to the load; decreasing a rotation speed of the first shaft from the flight rotation speed to a first idle rotation speed above the placarded zone; unclutching the first shaft from the load during the decreasing the rotation speed of the first shaft; and subsequently to the decreasing and the unclutching, simultaneously decreasing the rotation speeds of the first shaft and of the second shaft to a second idle rotation speed below the placarded zone, the simultaneously decreasing including clutching the first shaft to the load.

In a further aspect, there is provided a method of operating a multi-engine system, the multi-engine system having a first engine having a first shaft, a second engine having a second shaft, and a gearbox having a clutch system clutching at least one of the first shaft and the second shaft to a load, the first and second shafts having a range of rotation speeds defined as a placarded zone, the method comprising: rotating the first and second shafts at a flight rotation speed above the placarded zone when the first and second shafts are clutched to the load; decreasing a rotation speed of the first shaft from the flight rotation speed to a first idle rotation speed above the placarded zone; unclutching the first shaft from the load during the decreasing the rotation speed of the first shaft; and subsequently to the decreasing and the unclutching, simultaneously decreasing the rotation speeds of the first shaft and of the second shaft to a second idle rotation speed below the placarded zone, the simultaneously decreasing including clutching the first shaft to the load.

In a further aspect, there is provided a method of operating a multi-engine system of an helicopter, the multi-engine system having a first turboshaft engine having a first shaft, a second turboshaft engine having a second shaft, and a gearbox having a clutch system clutching at least one of the first shaft and the second shaft to a load of the helicopter, the first and second shafts having a range of rotation speeds defined as a placarded zone, the method comprising: simultaneously i) rotating the first shaft at a flight rotation speed when the first shaft is clutched to the load and ii) rotating the second shaft at a first idle rotation speed when the second shaft is unclutched to the load, the first idle rotation speed below the flight rotation speed and above the placarded zone; decreasing a rotation speed of the first shaft from the flight rotation speed to a given rotation speed within the placarded zone; decreasing a rotation speed of the second shaft from the first idle rotation speed to the given rotation speed within the placarded zone; clutching the second shaft to the load when the rotation speed of the second shaft reaches the given rotation speed within the placarded zone; and simultaneously decreasing the rotation speed of the first shaft and of the rotation speed of the second shaft to a second idle rotation speed below the placarded zone when the first shaft and the second shaft are clutched to the load.

In a further aspect, there is provided a system for operating a multi-engine system of an helicopter, the multi-engine system having a first turboshaft engine having a first shaft, a second turboshaft engine having a second shaft, and a gearbox having a clutch system clutching at least one of the first shaft and the second shaft to a load of the helicopter, the first and second shafts having a range of rotation speeds defined as a placarded zone, the system comprising: a processing unit; and a non-transitory storage medium having stored thereon program code executable by the processing unit for: simultaneously i) rotating the first shaft at a flight rotation speed when the first shaft is clutched to the load and ii) rotating the second shaft at a first idle rotation speed when the second shaft is unclutched to the load, the first idle rotation speed below the flight rotation speed and above the placarded zone; decreasing a rotation speed of the first shaft from the flight rotation speed to a given rotation speed within the placarded zone; decreasing a rotation speed of the second shaft from the first idle rotation speed to the given rotation speed within the placarded zone; clutching the second shaft to the load when the rotation speed of the second shaft reaches the given rotation speed within the placarded zone; and simultaneously decreasing the rotation speed of the first shaft and of the rotation speed of the second shaft to a second idle rotation speed below the placarded zone when the first shaft and the second shaft are clutched to the load.

In a further aspect, there is provided a method of operating a multi-engine system, the multi-engine system having a first engine having a first shaft, a second engine having a second shaft, and a gearbox having a clutch system clutching at least one of the first shaft and the second shaft to a load, the first and second shafts having a range of rotation speeds defined as a placarded zone, the method comprising: simultaneously i) rotating the first shaft at a flight rotation speed when the first shaft is clutched to the load and ii) rotating the second shaft at a first idle rotation speed when the second shaft is unclutched to the load, the first idle rotation speed below the flight rotation speed and above the placarded zone; decreasing a rotation speed of the first shaft from the flight rotation speed to a given rotation speed within the placarded zone; decreasing a rotation speed of the second shaft from the first idle rotation speed to the given rotation speed within the placarded zone; clutching the second shaft to the load when the rotation speed of the second shaft reaches the given rotation speed within the placarded zone; and simultaneously decreasing the rotation speed of the first shaft and of the rotation speed of the second shaft to a second idle rotation speed below the placarded zone when the first shaft and the second shaft are clutched to the load.

DESCRIPTION OF THE DRAWINGS

Reference is now made to the accompanying figures in which:

FIG. 2B is a schematic diagram of an exemplary multi-engine system for the aircraft of FIG. 2A, showing axial cross-sectional views of two gas turbine engines, in accordance with an illustrative embodiment;

FIG. 4 is a flow chart of a method of operating a multi-engine aircraft in a first run-up phase, in accordance with one or more embodiments;

FIG. 5 is a graph showing commanded engine regime, fuel supply rate and rotation speed as a function of time during the run-up phase of FIG. 4, in accordance with one or more embodiments;

FIG. 6 is a flow chart of a method of operating a multi-engine aircraft in a first run-down phase, in accordance with one or more embodiments;

FIG. 7 is a graph showing commanded engine regime, fuel supply rate and rotation speed as a function of time during the first run-down phase of FIG. 6, in accordance with one or more embodiments;

FIG. 8 is a flow chart of a method of operating a multi-engine aircraft in a second run-down phase, in accordance with one or more embodiments;

FIG. 10 is a schematic view of a controller of FIG. 3, in accordance with one or more embodiments;

DETAILED DESCRIPTION

There are described herein methods and systems for operating a multi-engine aircraft, which may be a multi-engine helicopter or other rotorcraft. Under certain conditions, for instance when the multi-engine aircraft is operated from an idle regime to a flight regime, or vice versa, it can be desirable to operate the aircraft in a manner preventing any of its engines' shaft to dwell within a range of rotation speeds defined as the placarded zone, which may excite undesirable vibration modes (e.g., bending modes, rigid modes, bounce modes) within the multi-engine aircraft. These vibration modes can be dynamic vibration modes due to supercritical shaft(s) of the multi-engine aircraft.

Figure 2A:
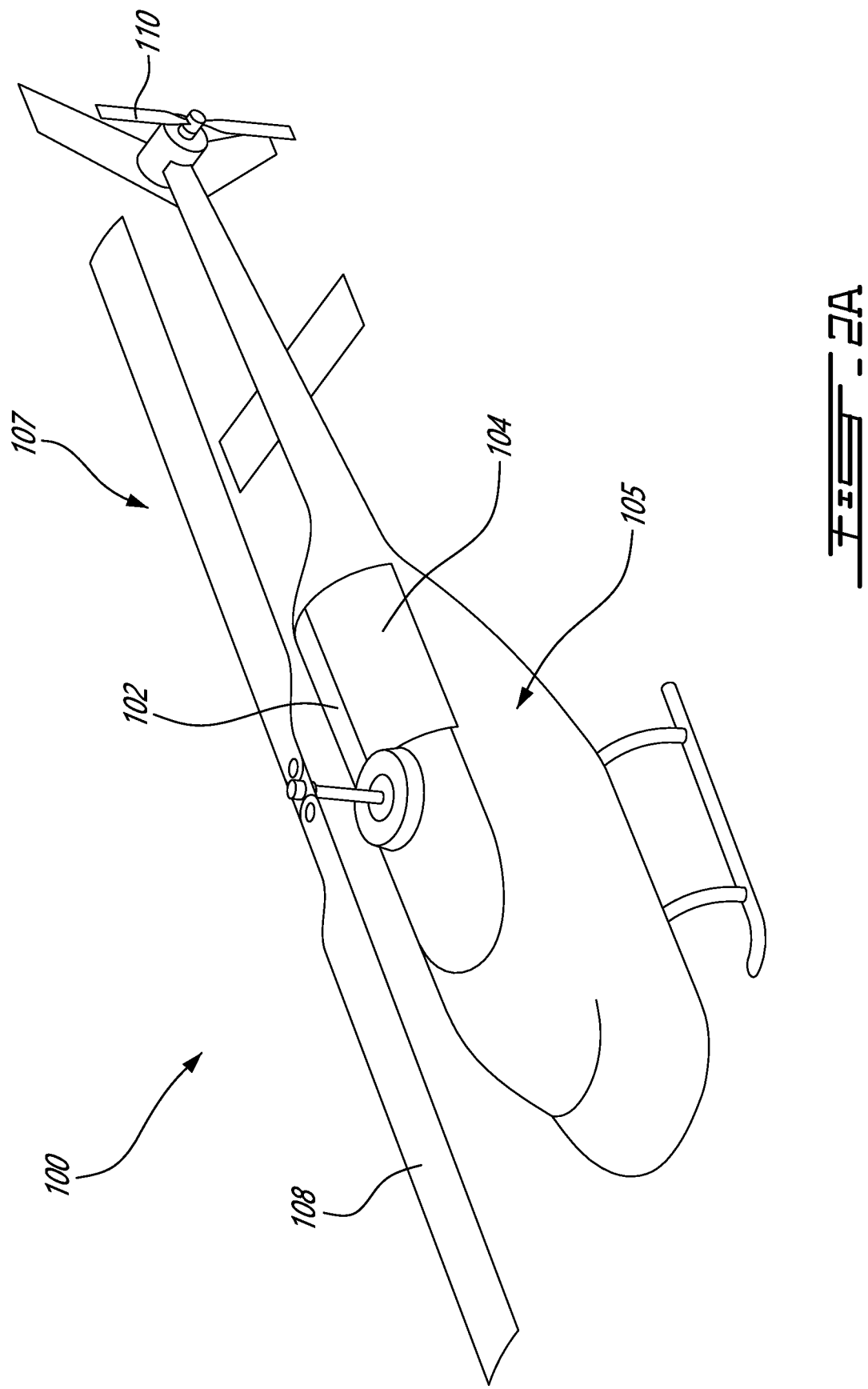
FIG. 2A is a schematic view of a multi-engine aircraft, in accordance with one or more embodiments.

FIG. 2A depicts an exemplary multi-engine aircraft 100, which in this case is a helicopter. The aircraft 100 includes at least first and second gas turbine engines 102 and 104. The first and second gas turbine engines 102 and 104 can be interconnected, in the case of the depicted helicopter application, by a common gearbox having a clutch system to form a multi-engine system 105 which drives a common load 107.

Turning now to FIG. 2B, illustrated is an example multi-engine system 105 that may be used as a power plant for an aircraft, including but not limited to a rotorcraft such as the helicopter 100. The multi-engine system 105 may include may not be limited to the first and second gas turbine engines 102 and 104 as the multi-engine system 105 can have more than two gas turbine engines. In the case of a helicopter application, such as the one illustrated in FIG. 1B, the first and second gas turbine engines 102 and 104 are turboshaft engines (hereinafter "the engines 102 and 104").

More particularly, the first and second engines 102 and 104 are interconnected by a common output gearbox 150 (also referred to herein as a "main gearbox") to drive a common load 107. In one embodiment, the common load 107 may comprise a rotary wing of a rotary-wing aircraft. For example, the common load 107 may be a main rotor 108 and a tail rotor 110 of the aircraft 100. Depending on the type of the common load 107 and on the operating speed thereof, each of the engines 102 and 104 may be drivingly coupled to the common load 107 via the output gearbox 150, which may be of the speed-reduction type.

For example, the gearbox 150 may have a plurality of transmission shafts 156 to receive mechanical energy from respective first and second shafts 154 of respective first and second 102 and 104. The gearbox 150 may be configured to direct at least some of the combined mechanical energy from the first and second engines 102 and 104 toward a common output shaft 158 for driving the common load 107 at a suitable operating (e.g., rotation) speed. It is understood that the multi-engine system 105 may also be configured, for example, to drive accessories and/or other elements of an associated aircraft. As will be described, the gearbox 150 may be configured to permit the common load 107 to be driven by either of the first and second engines 102 and 104 or, by a combination thereof.

In particular, in one embodiment, the first and second shafts 154 of the first and second engines 102 and 104 may be connected through a coupling (not shown) to an input module (not shown) from the gearbox 150. Each input module may comprise a first reduction stage (not shown) and a clutch system 152, allowing each of the first and second engines 102 and 104 to independently and individually clutch/declutch itself from the gearbox 150, and as such from any downstream load as in common load 107. For instance, the first shaft 154 of the first engine 102 may clutch to the common load 107 when its rotation speed meet a rotation speed of the second shaft 154 of the second engine 102, or vice versa. The first shaft 154 of the first engine 102 may declutch from the common load 107 when its rotation speed differs from a rotation speed of the second shaft 154 of the second engine 102. Both input modules may be connected within the gearbox 150 and meet at a second reduction stage 155, the first reduction stage and the second reduction stage 155 having their own reduction ratio. The common output shaft 158 may couple the second reduction stage 155 to the tail rotor 110 while another shaft (not shown) may couple the second reduction stage 155 to the common load 107.

Control of the multi-engine system 105 is effected by one or more controller(s) 210 (hereinafter "the controller 210"), which may be Full Authority Digital Engine Controller(s) (FADEC(s)), Electronic Engine Controller(s) (EEC(s)), Engine Control Unit(s) (ECU(s)), or the like, that are programmed to manage operation of the multi-engine system 105 in the idle regime, in a flight regime and in a transient phases between the idle regime and the flight regime. The first and second engines 102 and 104 may be controlled by the controller 210 to move from an idle regime in which the first engine 102 runs at lower power conditions to a flight regime in which the first engine 102 runs at full (or near-full) power conditions, and vice versa. In some embodiments, the clutch system 152 may be provided to permit each of the first and second engines 102 and 104 to be clutched and de-clutched from the aircraft's main gearbox, as desired, depending on the regime in which the first and second engines 102 and 104 are operated.

The controller 210 is configured to manage operation of the multi-engine system 105 in all transient phases of the typical aircraft mission. The transient phases of the typical aircraft mission can include, but are not limited to, a full idle phase in which both engines 102 and 104 are operated in an idle regime; a first run-up phase in which, while the first engine 102 remains in the idle regime, the second engine 104 is moved to a flight regime; a second run-up phase in which, while the second engine 104 remains in the flight regime, the first engine 102 is moved to the flight regime; a first run-down phase in which, while the first engine 102 remains in the flight regime, the second engine 104 is moved to the idle regime; and a second run-down phase in which, while the second engine 104 remains in the idle regime, the first engine 102 is moved to the idle regime as well. These transient phases can be encountered when the aircraft is on the ground, prior to take off and/or after a landing. Although in some applications, some or all of the transient phases can be encountered when the aircraft is in the air, off the ground. As described in greater detail below, the controller 210 is configured to prevent the first and second shafts 154 of the first and second engines 102 and 104 from rotating at rotation speeds within the placarded zone in the transient phases of the typical aircraft mission. It is noted that the terms first and second can be used interchangeably. For instance, the expressions "the first engine 102" and "the second engine 104" can be used interchangeably with the expressions "one of the engines 102 and 104" and "the other one of the first and second engines 102 and 104," respectively.

The controller 210 may control the engines' governing on speed according to appropriate schedule(s) or control regime. The controller 210 may comprise a first controller for controlling the first engine 102 and a second controller for controlling the second engine 104. The first controller and the second controller may be in communication with each other in order to implement the operations described herein. In some embodiments, a single controller 210 may be used for controlling the first engine 102 and the second engine 104. Although various differential control between the first and second engines 102 and 104 of the multi-engine system 105 are possible, in one particular embodiment the controller 210 may correspondingly control fuel flow (i.e., mass flow rate of fuel) to each of the first and second engines 102 and 104 accordingly. Although the examples described herein illustrate two engines, the system described herein is applicable to more than two engines, whereby at least one of the multiple engines is clutched to the common load 107 while the remaining engines are declutched from the common load 107.

Figure 1:
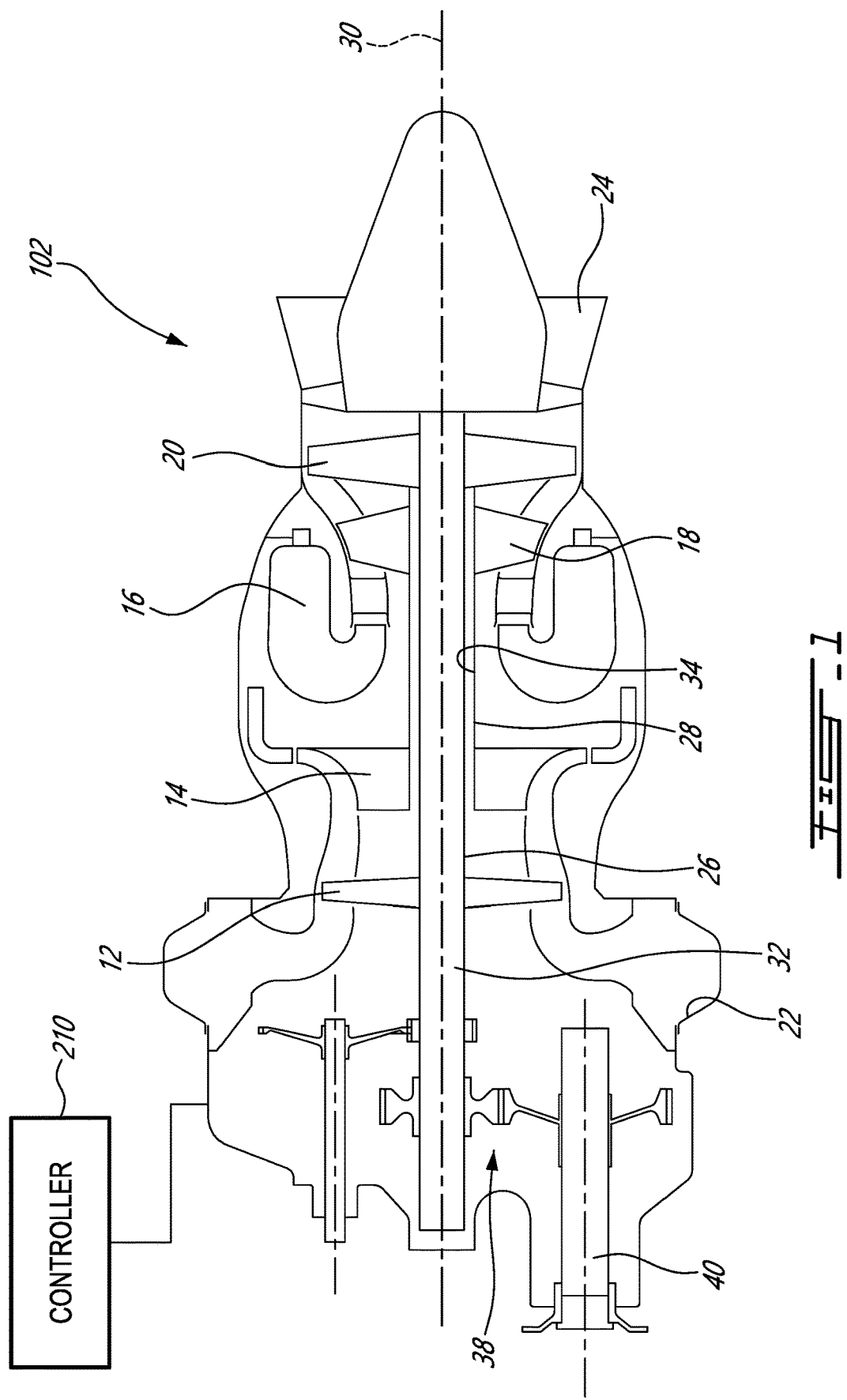
FIG. 1 is a cross-sectional view of an example turboshaft engine of the aircraft in accordance with an illustrative embodiment.

With reference to FIG. 1, the first and second engines 102 and 104 can be embodied as gas turbine engines. Although the foregoing discussion relates to the first engine 102, it should be understood that the second engine 104 can be substantively similar to the first engine 102. In this example, the engine 102 is a turboshaft engine generally comprising in serial flow communication a low pressure (LP) compressor section 12 and a high pressure (HP) compressor section 14 for pressurizing air, a combustor section 16 in which the compressed air is mixed with fuel and ignited for generating an annular stream of hot combustion gases, a high pressure turbine section 18 for extracting energy from the combustion gases and driving the high pressure compressor section 14, and a lower pressure turbine section 20 for further extracting energy from the combustion gases and driving at least the low pressure compressor section 12.

The low pressure compressor section 12 may independently rotate from the high pressure compressor section 14. The low pressure compressor section 12 may include one or more compression stages and the high pressure compressor section 14 may include one or more compression stages. A compressor stage may include a compressor rotor, or a combination of the compressor rotor and a compressor stator assembly. In a multistage compressor configuration, the compressor stator assemblies may direct the air from one compressor rotor to the next.

The engine 102 has multiple, i.e., two or more, spools which may perform the compression to pressurize the air received through an air inlet 22, and which extract energy from the combustion gases before they exit via an exhaust outlet 24. In the illustrated embodiment, the engine 102 includes a low pressure spool 26 and a high pressure spool 28 mounted for rotation about an engine axis 30. The low pressure and high pressure spools 26 and 28 are independently rotatable relative to each other about the axis 30. The term "spool" is herein intended to broadly refer to drivingly connected turbine and compressor rotors.

The low pressure spool 26 includes a low pressure shaft 32 interconnecting the low pressure turbine section 20 with the low pressure compressor section 12 to drive rotors of the low pressure compressor section 12. In other words, the low pressure compressor section 12 may include at least one low pressure compressor rotor directly drivingly engaged to the low pressure shaft 32 and the low pressure turbine section 20 may include at least one low pressure turbine rotor directly drivingly engaged to the low pressure shaft 32 so as to rotate the low pressure compressor section 12 at a same speed as the low pressure turbine section 20. The high pressure spool 28 includes a high pressure shaft 34 interconnecting the high pressure turbine section 18 with the high pressure compressor section 14 to drive rotors of the high pressure compressor section 14. In other words, the high pressure compressor section 14 may include at least one high pressure compressor rotor directly drivingly engaged to the high pressure shaft 34 and the high pressure turbine section 18 may include at least one high pressure turbine rotor directly drivingly engaged to the high pressure shaft 34 so as to rotate the high pressure compressor section 14 at a same speed as the high pressure turbine section 18. In some embodiments, the high pressure shaft 34 may be hollow and the low pressure shaft 32 extends therethrough. The two shafts 32 and 34 are free to rotate independently from one another. The engine 102 may include a transmission 38 driven by the low pressure shaft 32 and driving a rotatable output shaft 40. The transmission 38 may vary a ratio between rotational speeds of the low pressure shaft 32 and the output shaft 40.

As described hereinabove, control of the operation of the engine 102 can be effected by one or more control systems, for example the controller 210. The controller 210 can modulate a fuel flow provided to the engine 102, the position and/or orientation of variable geometry mechanisms within the engine 102, a bleed level of the engine 102, and the like. In some embodiments, the controller 210 is configured for controlling operation of multiple engines, for instance the first and second engines 102 and 104. For example, the controller 210 can be provided with one or more FADECs or similar devices. Each FADEC can be assigned to control the operation of one or more of the first and second engines 102 and 104. Additionally, in some embodiments the controller 210 can be configured for controlling operation of other elements of the aircraft 100, for instance the common load 107.

Figure 3:
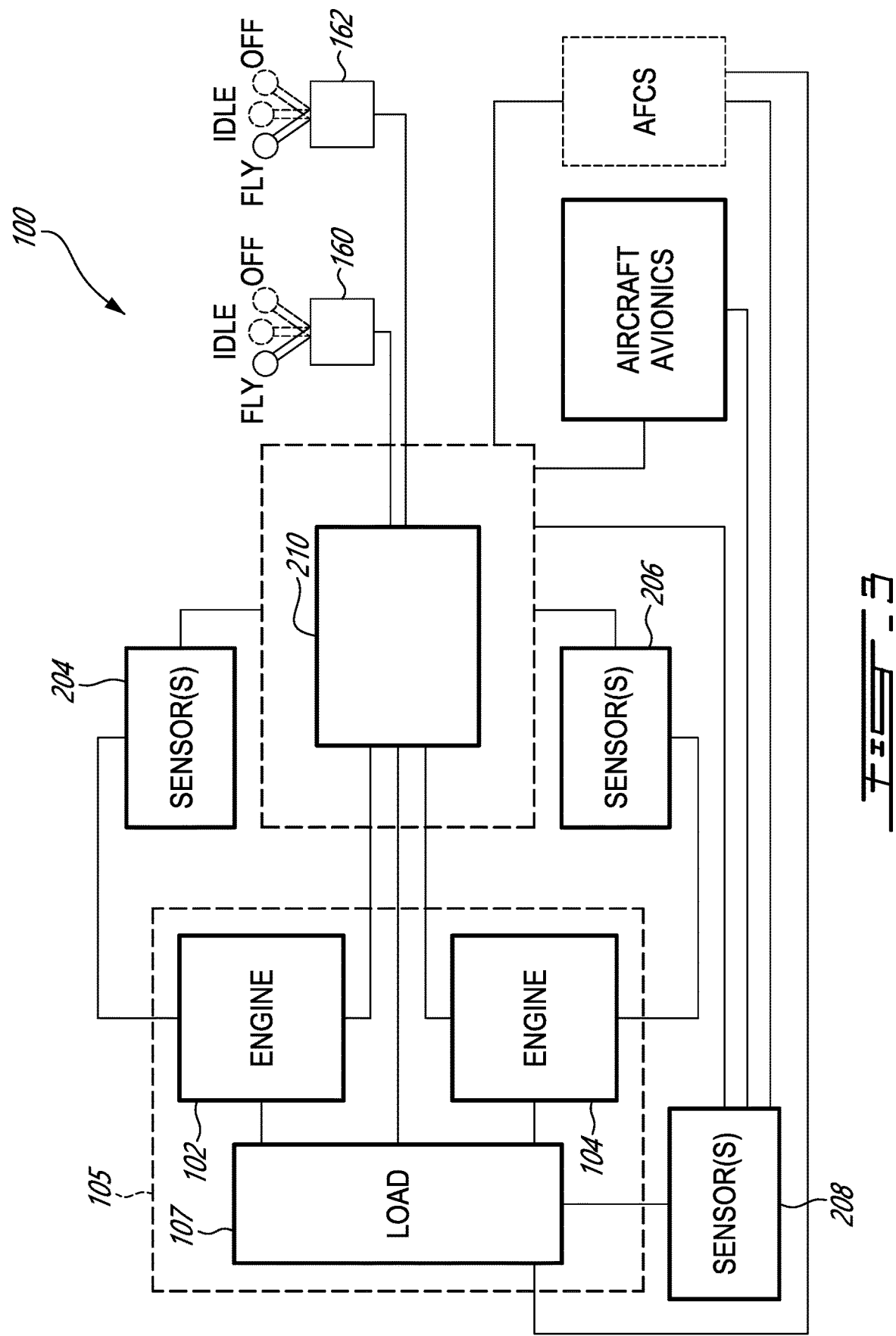
FIG. 3 is a block diagram of an example architecture for operating a multi-engine aircraft, in accordance with an illustrative embodiment.

With reference to FIG. 3, the aircraft 100, comprising the first and second engines 102 and 104 and the common load 107, is illustrated using a block diagram. More than the two engines 102 and 104 may be present on a same aircraft 100 in some other embodiments. The first and second engines 102 and 104 are mechanically coupled to the common load 107, for instance as illustrated in FIG. 1B, for causing the common load 107 to rotate and produce thrust for the aircraft 100. Although FIG. 3 illustrates a singular common load 107, it should be noted that the aircraft 100 can include any number of rotors, including multiple main rotors, one or more tail rotors, and the like. Collectively, the first and second engines 102 and 104, and the common load 107 form part of the multi-engine system 105, which is controlled by the controller 210 coupleable to one another via the gearbox and clutch system described above.

The multi-engine system 105 can be controlled by way of the controller 210, as described hereinabove. The controller 210 can be composed of various devices, including one or more FADEC(s), EEC(s), ECU(s), rotor controller(s), or any other suitable devices for controlling operation of the first and second engines 102 and 104, and/or the common load 107. In some embodiments, the operation of the first and second engines 102 and 104, and of the common load 107 is controlled by way of one or more actuators, mechanical linkages, hydraulic systems, and the like. The controller 210 can be coupled to the actuators, mechanical linkages, hydraulic systems, and the like, in any suitable fashion for effecting control of the first and second engines 102 and 104 and/or of the common load 107. For example, if a change in the operating conditions of the aircraft 100 is detected without any corresponding change in inputs from an operator of the aircraft 100, the controller 210 can adjust inputs provided to the first and second engines 102 and 104 and/or the common load 107 in order to compensate for the uncommanded change.

One or more sensors 204 and 206 are coupled to the first and second engines 102 and 104 for acquiring data about the operating parameters of the first and second engines 102 and 104. For instance, the sensors 204 and 206 can monitor a respective rotation speed of the shafts of the first and second engines 102 and 104, and report the measured rotation speeds to the system. Additionally, sensor(s) 208 are coupled to the common load 107 for acquiring data about the operating parameters of the common load 107. The sensor(s) 204, 206 and 208 may be any suitable type of sensor used to measure (continuously or periodically) operating parameters. The sensor(s) 204, 206 and 208 includes, but are not limited to, speed sensors, acceleration sensors, pressure sensors, temperature sensors, altitude sensors, weight on wheels sensors and the like. The sensor(s) 204, 206 and 208, can be coupled to the controller 210 in any suitable fashion, including any suitable wired and/or wireless coupling techniques. In some embodiments, operating parameters may be received from one or more other sources, including but not limited to a FADEC, an ECU, an EEC, or any related accessories that control any aspect of engine performance. In some embodiments, measurements obtained from the sensor(s) 204, 206 and 208 are used to calculate or determine other related parameters.

In some embodiments, the controller 210 is communicatively coupled to one or more power management switches (PMS) individually or collectively commanding operating regimes of the first and second engines 102 and 104. For instance, in the illustrated embodiment, first and second PMS 160 and 162 are commanding operation of the first and second engines 102 and 104, respectively, through the controller 210. In the depicted embodiment, the first and second PMS 160 and 162 each have a physical actuator such as a lever, a button, a knob and the like movable between an off position, an idle position and a fly position. In some embodiments, the first and second PMS 160 and 162 are provided in the form of graphical user interface(s) on a touch screen, for instance, where one or more digital buttons can allow actuation of the first and second PMS 160 and 162 as desired. In the off position, the corresponding engine is off; in the idle position, the corresponding engine is ignited and commanded to operate in an idle regime; and in the fly position, the corresponding engine is commanded to operate in a flight regime. The first and second PMS 160 and 162 may be actuated independently by a pilot of the multi-engine aircraft 100. Accordingly, to command the full idle phase, the PMS 160 and 162 are both moved to the idle position; to command the first run-up phase, one of the two PMS 160 and 162 is moved from the idle position to the fly position; to command the second run-up phase, the other one of the PMS 160 and 162 is moved from the idle position to the fly position; to command the first run-down phase, one of the PMS 160 and 162 is moved from the fly position to the idle position; to command the second run-down phase, the other one of the PMS 160 and 162 is moved from the fly position to the idle position, and to command a shut down phase, the PMS 160 and 162 are moved in the off position. The PMS 160 and 162 can be actuated by a flight crew member, or by the controller 210 depending on the embodiment.

Control of the multi-engine system 105 is effected by the controller 210, as described herein below, which manages the operation of the first and second engines 102 and 104 to prevent any one of the first and second engines 102 and 104 to dwell in the placarded zone during any of the transient phases of the typical aircraft mission. The risk of dwelling in the placarded zone can happen in situations when one of the first and second engines 102 and 104 is unclutched from the common load 107 and thereby free to rotate from an initial rotation speed to an impermissible rotation speed within the placarded zone. As described below, such situations may arise in transient phases of the typical aircraft mission such as the first run-up phase, the first run-down phase and the second run-down phase, for instance. An example method of operating the multi-engine system 105 to avoid dwelling in the placarded zone during the first run-up phase is described with reference to FIGS. 4 to 5A. An example method of operating the multi-engine system 105 to avoid dwelling in the placarded zone during the first run-down phase is described with reference to FIGS. 6 and 7. An example method of operating the multi-engine system 105 to avoid dwelling in the placarded zone during the second run-down phase is described with reference to FIGS. 8 and 9.

In twin engine arrangements, when the first and second engines 102 and 104 are in the idle regime, the first and second shafts 154 are clutched to the common load 107 and rotates at an idle rotation speed below the placarded zone (hereinafter "the low idle rotation speed"). It is generally uncommon to simultaneously command both engines from the idle regime to the flight regime. Therefore, while the first engine 102 remains in the idle regime, the second engine 104 is commanded into the flight regime first, as per the first run-up phase, which leads the first shaft 154 to unclutch and idle until its turn comes. However, it was found that the first shaft 154 of the first engine 102, when unclutched, is free to rotate more rapidly and may wander undesirably into the placarded zone, as shown by dashed line of bottom most graph of FIG. 5. To avoid this situation, it was found to provide a bit more fuel to a combustor section of the first engine 102 to bring the rotation speed of the first shaft 154 from the low idle rotation speed, below the placarded zone, to a second idle rotation speed above the placarded zone (hereinafter "the high idle rotation speed") during this transient process.

FIG. 4 shows a flow chart of a method 400 of operating the multi-engine system during the first run-up phase in which only one of the engines 102 and 104 is commanded to the flight regime. The method 400 is described with reference to FIG. 3 showing the multi-engine system 105. The method 400 is also described with reference to FIG. 5 showing a graph of the PMS positions associated with the first and second PMS 160 and 162, fuel flow supplied to each one of the first and second combustor sections of the first and second engines 102 and 104, and rotation speeds of the first and second shafts 154 during a full idle phase and a first run-up phase. It is noted that in the bottom-most graph of FIG. 5, the solid lines show the nominal, programmed, desired or otherwise reference rotation speeds for the first and second engines 102 and 104 during the first run-up phase whereas the dotted lines show the measured rotation speeds for the first and second engines 102 and 104.

At step 402, the first and second shafts 154 are rotated at the low idle rotation speed below the placarded zone when the first and second shafts are clutched to the common load 107. The other steps of the method 400 can be initiated at any time when the first and second engines 102 and 104 are in the full idle phase, i.e., when the first and second shafts 154 are clutched to the common load 107 and rotating at the low idle rotation speed below the placarded zone. In this phase, for instance at moment in time t0, the first and second PMS 160 and 162 are both at the idle position. As shown in this embodiment, the fuel flow that is supplied to each of the first and second combustor sections of the first and second engines 102 and 104 are similar to one another, and thereby the first and second shafts 154 both rotate at a similar rotation speed, in this case the low idle rotation speed below the placarded zone. In some embodiments, the method 400 is initiated upon receiving a command to operate the multi-engine system 105 in a first run-up phase including moving the first engine in a flight regime while maintaining the second engine in an idle regime. The method 400 can be initiated by a flight crew member or by the controller 210, depending on the embodiment, moving the first PMS 160 from the idle position to the fly position.

At step 404, the rotation speed of the first shaft 154 is increased from the low idle rotation speed to the flight rotation speed, with the flight rotation speed being above the placarded zone. In this specific embodiment, a fuel flow to a first combustor section of the first engine 102 is increased. The step 404 can be initiated at moment in time t1 when the first PMS 160 associated with the first engine 102 is moved from the idle position to the fly position. As shown, the rotation speeds of the first and second shafts 154 increase simultaneously as they are both clutched to the common load 107. However, in this specific embodiment, as the fuel flow to the first combustor section of the first engine 102 is greater than a fuel flow to the second combustor section of the second engine 104, the second shaft 154 may unclutch from the common load 107 when a difference in torque applied to the common load 107 exceeds a given threshold.

At step 406, the second shaft 154 unclutches from the common load 107. The unclutching of the second shaft 154 occurs when a rotation speed of the first shaft 154 increases from the low idle rotation speed to a flight rotation speed above the placarded zone based on the step 404 of increasing the rotation speed of the first shaft of the first engine 102. It is from that moment, e.g., moment in time t2, that a risk lies in letting the unclutched second shaft 154 freely rotate within the placarded zone which may generate unwanted vibrations.

Instead of decelerating the rotation speed of the second shaft 154 using existing engine decelerating systems for decelerating the second shaft 154 below the placarded zone, the method 400 has a step 408 in which the rotation speed of the second shaft is increased to the high idle rotation speed above the placarded zone and below the flight rotation speed. In some embodiments, the step 408 includes a step of increasing a fuel flow to a second combustor section of the second engine 104. For instance, the step 408 can be performed upon the unclutching of the second shaft 154 or shortly thereafter. The step 408 can be initiated at moment in time t1, at moment in time t2 or at any time between the moment in time t1 and the moment in time t2, depending on the embodiment. Maintaining the rotation speed of the unclutched shaft 154 at the high idle rotation speed after moment in time t3 can prevent the second shaft 154 from rotating at impermissible rotation speeds within the placarded zone and thereby prevent undesirable vibration modes of the multi-engine system 105 to be excited. In some embodiments, it was found convenient to maintain the increased fuel flow, which may include a fuel flow $FR_F$ to the first combustor section in order to maintain the first engine's rotation at the flight rotation speed and a fuel flow $FR_{HI}$ to the second combustor section to maintain the second engine's rotation at the high idle rotation speed, for the entirety of the first run-up phase of the aircraft mission. In this way, the first engine 102 can be operated in the flight regime while the second engine 104 can be operated in an idle regime and more specifically a high idle regime above the placarded zone.

The placarded zone is a zone in which undesirable vibration levels occur, or are considered likely to occur. The placarded zone can be predefined in terms of a range of rotation speeds in data available to an engine controller and which the engine controller can compare to values or rotation speeds sensed by a rotation speed sensor, for instance. In such a scenario, the engine controller can be configured to move the current rotation speed just above the predefined placarded zone values upon detecting that the current value of rotation speed is within the placarded zone or is heading towards the placarded zone, for instance. In an alternate embodiment, the placarded zone can be definable in real time by an engine controller based on vibrations, in which case the engine controller can have instructions to increase the rotation speed when one or more vibration sensors provide an indication of vibrations exceeding a given vibration threshold, for instance, and potentially taking additional factors into consideration. Various other implementation modes are possible. In many various implementations, the low idle rotation speed corresponding to the clutched state and below the placarded zone will be significantly lower, e.g. more than 10% lower, than the high idle rotation speed corresponding to the unclutched state and above the placarded zone. The flight rotation speed, also corresponding to a clutched state, will be significantly higher, e.g. more than 10% higher, than the high idle rotation speed.

Still referring to FIG. 5, the range of rotation speeds of the placarded zone can have a lower limit and an upper limit. In some embodiments, the lower and upper limits of the placarded zone of one of the first and second engines 102 and 104, typically the engine in the idle regime ("the idling engine"), are expressed relatively to a rotation speed of the shaft of the other one of the first and second engines, typically the engine in the flight regime ("the non-idling engine"), or vice versa. In some embodiments, the placarded zone is above a low idle rotation speed when the shaft is in a clutched state, below the flight rotation speed and below a high idle rotation speed when the shaft is in an unclutched state. The placarded zone includes rotation speeds where an unclutched shaft would dwell if its rotation speed was not increased to the high idle rotation speed or decreased to the low idle rotation speed using the methods and systems described herein. For instance, in some embodiments, the low idle rotation speed is at 50% of the flight rotation speed. In these embodiments, the placarded zone can have a range of about 10-30% of the flight rotation speed and that range may extends between the low idle rotation speed and the flight rotation speed, or between the low idle rotation speed and the high idle rotation speed. Typically, the high idle rotation speed can typically be set as close as possible to the upper limit of the placarded zone to minimize fuel consumption while maintaining proper safety margins. The value ranges correspond to standard safety margins for at least some turboshaft engines, and can differ from one embodiment to another.

In some embodiments, the step 404 of increasing the rotation speed of the first shaft is initiated prior to initiation of the step 408 of increasing the rotation speed of the second shaft. In some other embodiments, the step 404 of increasing the rotation speed of the first shaft is initiated simultaneously to the step 408 of increasing the rotation speed of the second shaft. In these latter embodiments, the rate of change of the rotation speed of the first shaft can be greater than a rate of change of the rotation speed of the second shaft. In some embodiments, the rate of change in fuel flow to the first combustor section can be quicker than a rate of change in fuel flow to the second combustion section. In some embodiments, the step 404 of increasing the rotation speed of the first shaft is performed progressively and in accordance with a first linear increase rate r1. The step 408 of increasing the rotation speed of the second shaft can be performed progressively and in accordance with a second linear increase rate r2. In some embodiments, the first linear increase rate r1 can be steeper than the second linear increase rate r2. For instance, the first linear increase rate r1 can be at least twice the second linear increase rate r2, depending on the embodiment. In these embodiments, a difference between the first linear increase rate and the second linear increase rate causes the first shaft 154 of the first engine 102 to accelerate more quickly than the second shaft 154 which can lead to the unclutching of the second shaft 154 of the second engine 104 that occurs at step 406. In some embodiments, the step 408 of increasing the rotation speed of the second shaft is performed upon detecting that the second shaft has unclutched from the common load 107.

It is noted that the reference rotation speeds for the first and second shafts 154 of the first and second engines 102 and 104, such as shown in the bottom-most graph of FIG. 5, can be programmed at the controller 210. In these embodiments, the controller 210 can monitor, from any one of the sensors 204 and 206 for instance, the rotation speeds of the first and second shafts 154 of the first and second engines 102 and 104 and modify the fuel flow to the first and second combustor sections to ensure that the measured rotation speeds correspond to the desired rotation speeds plus or minus a given tolerance. In some embodiments, the controller 210 can monitor a pressure fluctuation signal or a vibration pick-up level threshold to determine when to increase the fuel flow in order to exit from the placarded zone and stay above. In some embodiments, the controller 210 can increase or decrease the rotation speed of a shaft within the engine rather than directly supplying more fuel flow. In some embodiments, minimum speed limit of other shafts and change in variable geometry (e.g., variable guide vane, bleed valve). In some embodiments, electric motor and/or generator can modulate power supplied to the engine to control the rotation speed of the shaft, for instance. In these latter embodiments, the power can be supplied either an electric starter or the electric motor of an hybrid configuration, for instance.

Figure 5A:
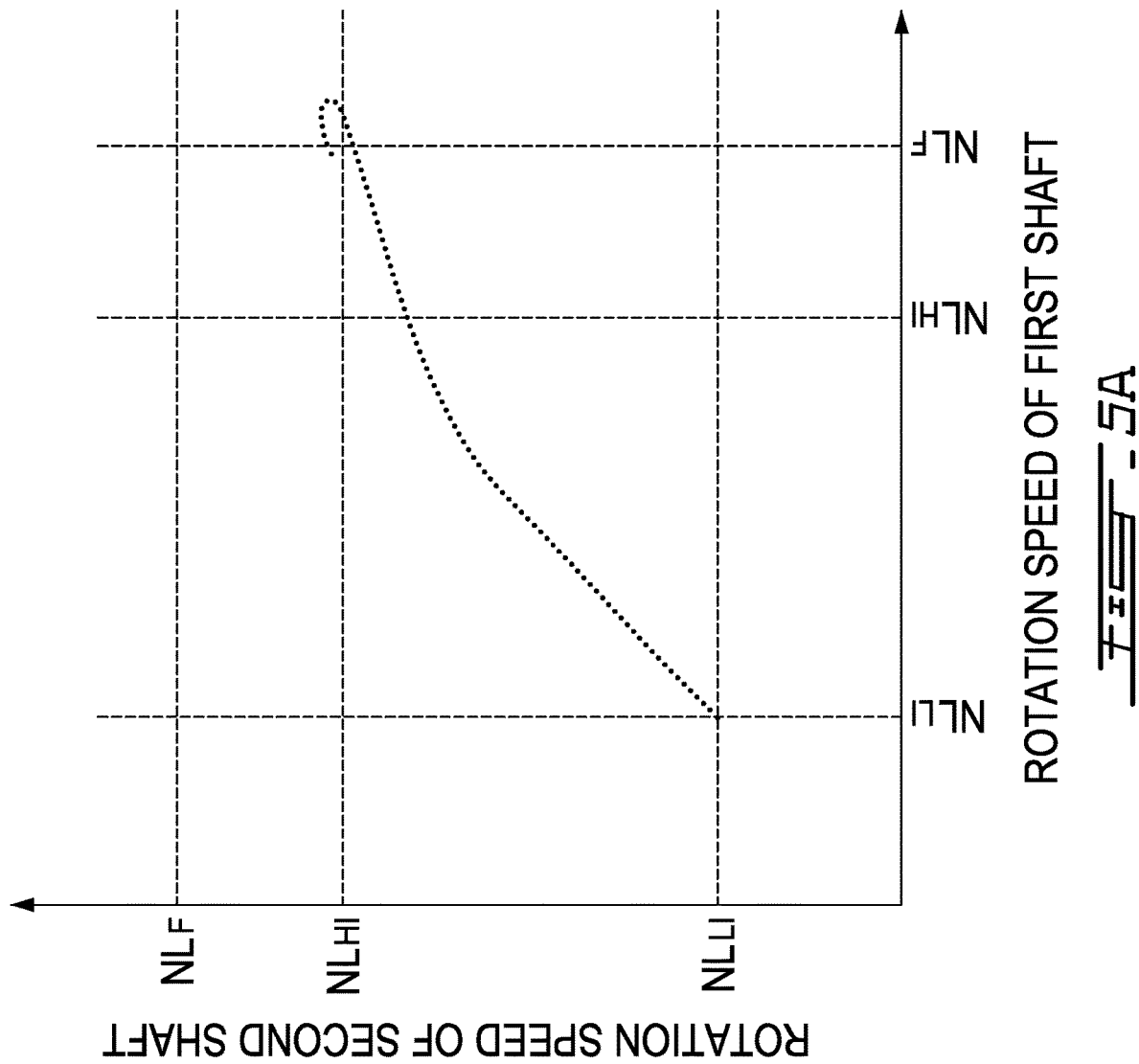
FIG. 5A is a graph showing rotation speed of a second shaft as a function of rotation speed of a first shaft, in accordance with an illustrative embodiment.

In a second run-up phase, the second engine may be brought to the flight regime by increasing the fuel flow to the second combustor section of the second engine 104. This increase may be initiated at a moment in time subsequent to moment in time t3 when the second PMS 162 associated with the second engine 104 is moved from the idle position to the fly position. An example of the second run-up phase is shown in FIG. 5 as well. Referring now to FIG. 5A, there is shown a graph of the rotation speed of the unclutched second shaft as a function of the rotation speed of the clutched first shaft. As shown, as the rotation speed of the clutched first shaft increases from the low idle rotation speed to the flight rotation speed, the rotation speed of the unclutched second shaft increases from the low idle rotation speed to the high idle rotation speed.

In twin engine arrangements, it is generally desirable to bring the first and second engines 102 and 104 asynchronously from the fly regime to the idle regime. However, the first one of the first and second engines 102 and 104 to be moved from the flight regime to the idle regime may idle in the placarded zone. To avoid this, more fuel than would otherwise be required is supplied to the idling engine to keep it above the placarded zone.

FIG. 6 shows a flow chart of a method 600 of operating the multi-engine system during the first run-down phase in which only one of the engines 102 and 104 is commanded to the idle regime. The method 600 is described with reference to FIG. 3 showing the multi-engine system 105. The method 600 is also described with reference to FIG. 7 showing a graph of the PMS positions associated with the first and second PMS 160 and 162, fuel flow supplied to each of the first and second combustor sections of the first and second engines 102 and 104, and rotation speeds of the first and second shafts 154 during a full flight phase and a first run-down phase.

At step 602, the first and second shafts 154 are rotated at the flight rotation speed above the placarded zone when the first and second shafts 154 are clutched to the common load 107. The other steps of the method 600 can be initiated at any time when the first and second engines 102 and 104 are in such a flight regime. In this phase, for instance at moment in time t4, the first PMS 160 and 162 are both at the flight position. As shown in this embodiment, the fuel flow that is supplied to each of the first and second combustor sections of the first and second engines 102 and 104 are similar to one another, and may correspond to fuel flow $FR_F$ as introduced above, and thereby the first and second shafts 154 both rotate at a similar rotation speed, in this case a flight rotation speed above the high idle rotation speed and above the placarded zone. In some embodiments, the method 600 is initiated upon receiving a command to operate the multi-engine system 105 in a first run-down phase including moving the first engine in an idle regime while maintaining the second engine in the flight regime. The method 600 can be initiated by a flight crew member or by the controller 210, depending on the embodiment.

At step 604, the rotation speed of the first shaft is decreased from the flight rotation speed to the high idle rotation speed above the placarded zone. This step can be performed by decreasing a fuel flow to the first combustor section of the first engine in some embodiments. As shown, the step 604 can be initiated at moment in time t5 when the first PMS 160 associated with the first engine 102 is moved from the fly position to the idle position. In this transient phase, the second PMS 162 is kept in the fly position. In some embodiments, the step 604 of decreasing the rotation speed of the first shaft 154 is simultaneous to maintaining a rotation speed of the second shaft steady.

At step 606, the first shaft 154 unclutches from the common load 107 during the decreasing of the rotation speed of the first shaft. In the illustrated embodiment, the unclutching of the first shaft 154 occurs at moment in time t6, for instance, and it is from that moment in time that a risk exists in letting the first shaft 154 of the first engine freely rotate which may cause it to wander in the placarded zone. It is noted that, during the decreasing, a difference between a rotation speed of the first shaft and a rotation speed of the second shaft may cause the unclutching of the first shaft from the common load 107.

Subsequently to the steps 604 and 606, the method 600 has a step 608 of simultaneously decreasing the rotation speeds of the first and second shafts 154 to the low idle rotation speed below the placarded zone. The step 608 includes a step of clutching the first shaft 154 to the common load 107, as will be described further below.

When the rotation speed reaches the high idle rotation speed, for instance at moment in time t7, the method 600 can maintain the fuel flow, such as fuel flow $FR_{HI}$, to the first combustor section. Maintaining the fuel flow to the first combustor section, such as fuel flow $FR_{HI}$, greater than would otherwise be required for the low idle rotation speed, such as the low idle fuel flow $NL_{LI}$ shown in FIG. 7, can ensure that the rotation speed of the first shaft 154 remains at the high idle rotation speed above the placarded zone and thereby avoid unwanted vibrations in the first engine 102 during the first run-down phase.

The range of rotation speeds of the placarded zone can have a lower limit and an upper limit such as those described above with reference to FIG. 5. As the idle rotation speed of one of the first and second shafts can change depending on the actual rotation speed of the other one of the first and second shafts, the method 600 can include a step of monitoring the rotation speeds of the first and second shafts in real time. In these embodiments, the fuel flow supplied to each of the first and second combustor sections of the first and second engines 102 and 104 may depend on the measured rotation speeds of the first and/or second shafts as monitored. Accordingly, the method 600 can include a step of comparing the measured rotation speeds to reference rotation speeds and a step of adjusting the fuel flow to the first combustor section or other engine parameters based on the step of comparing.

In some embodiments, the step 604 of decreasing the rotation speed of the first shaft is performed progressively. This progressive decrease may not be constant. For instance, the progressive decrease can include a first decrease rate r3 and a second decrease r4 subsequent to and different from the first decrease rate r3, such as shown in FIG. 7. In this embodiment, once the first shaft 154 unclutches from the common load 107, a lesser fuel flow is required as torque to the common load 107 is no longer applied. Accordingly, a lesser fuel flow is required for the first shaft to continue its decrease in rotation speed. In the illustrated embodiment, the second decrease rate r4 is steeper than the first decrease rate r3. The second decrease rate r4 may be twice the first decrease rate r3 in some embodiments. The second decrease rate r4 can be applied upon detecting that the first shaft 154 has unclutched from the common load 107. It is noted that, in some embodiments, the fuel flow supplied to the first combustor section of the first engine during step 604 may wander lower than the fuel flow required to maintain the rotation speed of the first shaft to the high idle rotation speed. In these embodiments, a step of maintaining the fuel flow to the first combustor section can be provided, and may include a step of increasing the fuel flow to the first combustor section back to the fuel flow $FR_{HI}$ required to maintain the rotation speed of the first shaft to the high idle rotation speed. An example of such a fuel flow curve is shown as a dotted line in the middle graph of FIG. 7.

From a situation where the first engine 102 is in the idle regime rotating at the high idle rotation speed and the second engine 104 is in the flight regime rotating at the flight rotation speed, it may be desirable to bring the first and second engines 102 and 104 to the idle regime together. One may not simply move the second engine 104 from the flight regime to the idle regime because this may lead the second engine 104 to unclutch and potentially idle in the placarded zone. To circumvent such as undesirable situation, it was found convenient to decrease the fuel flow to both the first and second engines 102 and 104 simultaneously, but not at the same rate. In this way, the fuel flow decreases to the second engine 104, the formerly "fly" or non-idling engine, is steeper than the fuel flow decrease rate to the first engine 102, the formerly "high idle" or idling engine, to allow the first engine 102 to re-clutch while maintaining the clutching of the second engine 104.

Figure 9:
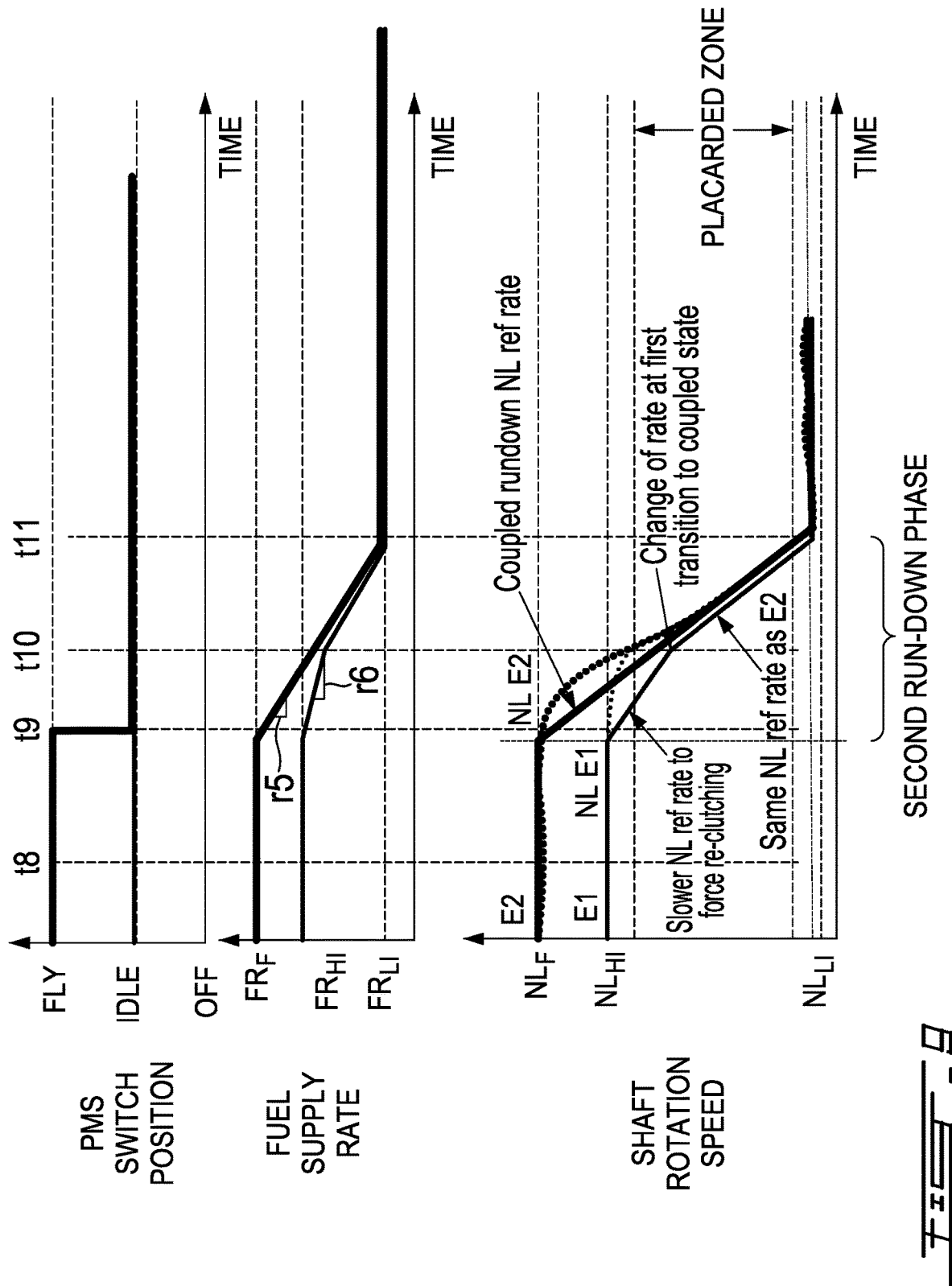
FIG. 9 is a graph showing commanded engine regime, fuel supply rate and rotation speed as a function of time during the second run-down phase of FIG. 8, in accordance with one or more embodiments.

FIG. 8 shows a flow chart of a method 800 of operating the multi-engine system during the second run-down phase in which the first and second engines 102 and 104 are commanded to the idle regime. The method 800 is described with reference to FIG. 3 showing the multi-engine system 105. The method 800 is also described with reference to FIG. 9 showing a graph of the PMS positions associated with the first and second PMS 160 and 162, fuel flow supplied to each of the first and second combustor sections of the first and second engines 102 and 104, and rotation speeds of the first and second shafts 154 during a second run-down phase. It is noted that in the bottom-most graph of FIG. 9, the solid lines show the nominal, programmed, desired or otherwise reference rotation speeds for the first and second engines 102 and 104 during the first run-down phase whereas the dotted lines show the measured rotation speeds for the first and second engines 102 and 104.

At step 802, the first shaft is rotated at the flight rotation speed when the first shaft is clutched to the common load 107 and the second shaft is rotated at the high idle rotation speed when the second shaft is unclutched to the common load 107. The other steps of the method 800 can be initiated at any time when the first engine 102 is in the flight regime and the second engine 104 is in the idle regime. In this phase, for instance at moment in time t8, the first PMS 160 is in the fly position and the second PMS 162 is in the idle position. As shown in this embodiment, the fuel flow $FR_{HI}$ that supplied to the first combustor section of the first engine 102 is greater than the fuel flow $FR_F$ supplied to the second combustor section of the second engine 104, and thereby the first and second shafts 154 rotate at the flight rotation speed and the high idle rotation speed, respectively. In some embodiments, the method 800 is initiated upon receiving a command to operate the multi-engine system 105 in a second run-down phase including moving the first engine 102 in the idle regime as well. The method 800 can be initiated by a flight crew member or by the controller 210, depending on the embodiment.

At step 804, the rotation speed of the first shaft is decreased from the flight rotation speed to a given rotation speed within the placarded zone. At step 806, the rotation speed of the second shaft is decreased from the high idle rotation speed to the given rotation speed within the placarded zone. In some embodiments, the decrease in rotation speed of the second shaft can be more quickly than the decrease in rotation speed of the first shaft. As shown, the steps 804 and 806 can be initiated at moment in time t9 when the first PMS 160 associated with the first engine 102 is moved from the fly position to the idle position. In some embodiments, the decrease in rotation speed can be performed by a corresponding decrease in fuel flow to the corresponding combustion sections of the first and second engines. For instance, the decrease in fuel flow to the first combustor section can be simultaneous to the decrease in fuel flow to the second combustor section.

At step 808, such as schematically illustrated at moment in time t10, the second shaft clutches to the common load 107 when a rotation speed of the second shaft 154 reaches the given rotation speed within the placarded zone.

At step 810, the rotation speed of the first shaft and the rotation speed of the second shaft are simultaneously decreased to the low idle rotation speed below the placarded zone when the first and second shafts are clutched to the common load 107. In some embodiments, the step 810 is performed upon detecting that the second shaft has clutched to the common load 107.

In some embodiments, the decrease of the fuel flow to the first combustor section is performed progressively and in accordance with a first linear decrease rate r5. The decrease of the fuel flow to the second combustor section is performed progressively and in accordance with a second linear increase rate r6. In some embodiments, the first linear increase rate r5 is twice as steep as the second linear increase rate r6. This difference between the first linear increase rate r5 and the second linear increase rate r6 can cause the clutching of the second shaft to the common load 107, as it forces the rotation speeds of the first and second shafts 154 to meet at the given rotation speed within the placarded zone. Although the rotation speeds of the first and second shafts 154 meet within the placarded zone, the first and second shafts 154 are both clutched to the main load 107 and can accordingly be forced below the placarded zone by decreasing their fuel flow values simultaneously.

It is noted that the methods described above can be implemented by a system comprising a processing unit, and a non-transitory storage medium having stored thereon program code executable by the processing unit for performing the steps of the methods described above. In some embodiments, the system is provided in the form of the controller 210. In other embodiments, the system is provided in the form of a controller external to the controller 210 but in communicative coupled therewith. Accordingly, the system can directly or indirectly control the fuel flow supplied to the first and second engines, receive sensor data from any one of the sensors of the multi-engine system 105 and inputs from the first and second PMS switches for instance. It is noted that the methods described above may be performed only when the controller 210 determines that the aircraft is on ground. For instance, the controller 210 may be communicatively coupled to one or more sensor(s) detecting whether weight is imparted on the wheels on the aircraft.

The controller 210 can be provided as a combination of hardware and software components. The hardware components can be implemented in the form of a computing device 1000, an example of which is described with reference to FIG. 10. Moreover, the software components of the controller 210 can be implemented in the form of one or more software applications (not shown).

Referring to FIG. 10, the computing device 1000 can have a processor 1002, a memory 1004, and I/O interface 1006. Instructions 1008 for performing the methods 400, 600 and 800 described above with reference to FIGS. 4, 6 and 8 can be stored on the memory 1004 and accessible by the processor 1002.

The processor 1002 can be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

The memory 1004 can include a suitable combination of any type of computer-readable memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 1006 enables the computing device 1000 to interconnect with one or more input devices, such as TBD, or with one or more output devices such as TBD.

Each I/O interface 1006 enables the controller TBD to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Example 1—PMS-Based Control of the First and Second Engines in the Transient Phase of the Aircraft Mission In some embodiments, the methods and systems described above are performed based on parameters received at the controller 210. For instance, the controller 210 may receive a weight-on-wheels (WOW) state, PMS positions for the first and second engines, and rotation speeds of the first and second shafts measured in real time. In this example, when the WOW state is true, the aircraft is on the ground and when the WOW state is false, the aircraft has lifted off from ground and is in the air. In some embodiments, airspeed of the aircraft can be used to determined whether it is airborne. For the sake of simplicity, in this example, NL1 and NL1ref denote the measured and reference rotation speeds of the first shaft of the first engine, respectively. NL2 and NL2ref denote the measured and reference rotation speeds of the shaft of the second engine, respectively. Also, NL denotes a reference speed corresponding to the rotation speed of the shaft of the engine when operated in the flight regime, i.e., the flight rotation speed. In this example, the range of rotation speeds of the placarded zone spans from 65% NL to 75% NL. Accordingly, the low idle rotation speed can correspond to 50% NL, the high idle rotation speed can correspond to 80% NL and the flight rotation speed can correspond to 100% NL. However, the range values associated to the placarded zone can differ in some other embodiments.

Table 1 summarizes the reference rotation speeds NL1ref and NL2ref as a function of the PMS positions when WOW is true. These scenarios ensure that the idling engine does not dwell in the placarded zone which is defined at ranging from 65% NL to 75% NL in this embodiment.

TABLE 1

Reference rotation speeds NL1ref and NL2ref as a function of PMS positions

| PMS POSITION OF FIRST ENGINE | PMS POSITION OF SECOND ENGINE | NL2ref | NL1ref |
|---|---|---|---|
| IDLE | IDLE (or OFF) | 50% NL (or 0% NL) | 50% NL (below the placarded zone) |

TABLE 1-continued

Reference rotation speeds NL1ref and NL2ref as a function of PMS positions

| PMS POSITION OF FIRST ENGINE | PMS POSITION OF SECOND ENGINE | NL2ref | NL1ref |
|---|---|---|---|
| IDLE | FLY | 100% NL | 80% NL (above the placarded zone) |
| IDLE | Transition from IDLE to FLY | Transition from 50% NL to 100% NL at a given rate r1 | Transition from 50% NL to 80% NL at a rate r2 smaller than the rate r1* NL1ref ≤ NL1 + 5% NL1ref ≤ NL2 |
| IDLE | Transition from FLY to IDLE | Transition from 100% NL to 50% NL at a given rate r5 | Transition from 80% NL to 50% NL at a rate r6 smaller than the rate r5** NL1ref ≤ NL2 |
| IDLE | Transition from FLY to OFF (or uncommanded flameout) | Transition from 100*NL to 0% NL | Transition from 80% NL to 50% NL at a given rate r5 |

*The rate r2 may be half the rate r1, e.g., r2 = 50%*r1.
**The rate r6 may be half the rate r5, e.g., r6 = 50%*r5.

As presented in Table 1 above, the WOW state, the PMS positions and the reference rotation speeds of the first and second engines are used by the controller, e.g., the EEC, to select the appropriate fuel flow value(s) to the first and second combustor sections to ensure that the measured rotation speeds NL1 and NL2 stay within an acceptable range of the associated reference rotation speeds NL1ref and NL2ref to avoid dwelling in the placarded zone.

In some embodiments, the PMS position is preferred to determine whether the first engine is coupled or decoupled instead of the unclutched flag (based on torque) since it allows more robust determination of the clutched/declutched states (or equivalently coupled/decoupled states) whereas using the declutched flag may lead to higher risk of toggling between the two states and subsequent instability on the flight rotation speed determination.

In the first run-up phase, the first engine declutching during a run-up will increase its NL1ref at a slower rate than the second engine to force the first engine to declutch from the main load (e.g., when NL1<NL2) and let the second engine steadily carry the helicopter rotor load. Similarly, the first engine clutching during a run-down will decrease its rotation speed NL1ref at a slower rate than the second engine to force the first engine to re-clutch to the main rotor transmission (e.g., when NL1=NL2) and avoid dwelling in the placarded speed zone.

On turboshaft applications, it is desirable that the A/C rotor does not produce excessive lift before take-off as the rotor speed accelerates to reach the flight rotation speed. For that reason, on ground, if a run-up is requested (PMS transition from IDLE to FLY) while collective lever position (CLP) is above a certain value (such as 20% for instance), the run-up is inhibited. In that situation, if the first engine is in the idle regime, a basic control logic would tend to increase the first engine's rotation speed NL1ref (from 50% to 80% NL for instance) to avoid dwelling into the placarded zone (defined from 65% to 75% NL for instance). However, having the CLP above the threshold value will prevent the second engine from performing it's run-up (inhibited) but the first engine will believe it is performing a run-up since the second engine's PMS position is at the FLY position. This could lead to a situation where the first engine would increase its rotation speed NL1ref from 50% NL to 80% NL believing it will decouple while the second keeps its rotation speed NL2 at 50%. This would hence lead the first engine to take the A/C rotor load and perform a partial run-up to 80% NL while CLP is above the threshold value therefore producing a portion of the lift the customer wanted to avoid.

In order to prevent this undesirable outcome as well as other potential interactions between the two engines in cases where the second engine carrying the A/C rotor load is slow to spool up or fast to spool down, a requirement is added in column NL1 in Table 1 so that NL1ref may not exceed the second engine rotation speed NL2 within a given tolerance during the second engine's transitions IDLE to FLY and FLY to IDLE.

It is also specified in column NL1ref of Table 1 that NL1ref may not exceed the rotation speed NL1 plus a given margin (5% for instance) during the second engine PMS transitions IDLE to FLY in order to prevent significant NL variations and associated torque spikes in case the rotation speed reference value gets too far above the current rotation speed when an engine limit initially preventing the engine's rotation speed from reaching its rotation speed reference value is lifted.

In a flight regime, i.e., when WOW is false, the first engine's NL1ref is set to 80% NL regardless of the second engine's PMS position, to allow faster run-up to FLY (100% NL) of the first engine if the second engine shuts-down. It is noted that the methods disclosed herein allow for proactive management of the low idle and/or high idle rotation speeds for smooth transition between IDLE and FLY of the second engine, from a speed and a torque (clutching/declutching) point of view. Accordingly, predictability and repeatability of the first engine's rotation speed variation can be enhanced.

In some embodiments, the increase in rotation speed when the engine moves from the idle regime to the flight regime is about +4% NL/second. In some embodiments, the decrease in rotation speed when the engine moves from the flight regime to the idle regime is about −4% NL/second. The maximum difference between the measured rotation speeds NL1 and NL2 and their corresponding reference rotation speeds NL1ref and NL2ref can be about 5% NL when transitioning between 50% NL and 80% NL. In other embodiments, this difference can be 6% NL or more. In some embodiments, the low idle rotation speed ranges between 50% NL and 65% NL. In some embodiments, the high rotation speed ranges between 75% NL and 80% NL. In some embodiments, it is envisaged that the methods and systems disclosed herein can include ranges for the low and high idle rotation speeds as targets for each one of the transient phases of the typical aircraft mission. Accordingly, some predetermined increases and/or decreases in fuel flow for the first and second engines can be applied until the desired target ranges of rotation speeds are achieved for both engines.

In some embodiments, a condition specifying that the rotation speed NL1 can preferably remain below the rotation speed NL2 is optional for smoother interactions between the two engines. An inhibited run-up of the second engine can be handled by the CLP threshold directly in some embodiments. Although it has been mentioned that the run-up and run-down phases of the aircraft are performed while the aircraft is on the ground, the methods and systems described herein can be used also in flight, i.e., regardless of the WOW state, in some other embodiments. It is noted that, in some embodiments, the toggling between the low and high idle rotation speeds can be based on a decoupled flag (torque sensors signal analysis) of the engines instead of the PMS position. However, using the PMS has been found to be advantageous in at least some situations.

Other techniques to prevent the idling engine from running into a placarded speed zone can simply bump up the rotation speed when the resulting speed of the idling engine at IDLE fall within the placarded zone. Such techniques can present the inconvenience of not being proactive when the non-idling engine PMS position changes from FLY to IDLE and would prevent from having smooth clutching upon both engines reaching a common rotation speed. This technique may rely on a detection mechanism and a placarded zone avoidance mechanism including, but not limited to, detection mechanism based on the rotation speeds, vibration pick-up, dynamic pressure fluctuation and the like. The placarded zone avoidance mechanism can change minimum fuel flow, change minimum core speed and change variable geometry (e.g., VGV, bleed valve) in order to have the resulting rotation speed outside of the placarded zone. In some embodiments, a multi-engine system can have at least a few placarded speed zones. In these embodiments, more than two idle rotation speeds can be defined between the placarded speed zones to avoid dwelling in any of the placarded zones. It is emphasized that the methods and systems described herein can be applied to the rotation speed of any shaft(s) or spool(s) of the gas turbine engine. For instance, in some embodiments, the rotation speed NL may be associated with a rotation speed of the low pressure turbine spool. However, in some other embodiments, the rotation speed can be associated to other types of shafts such as the high pressure turbine spool, or any other output shaft rotating within the gas turbine engine. In some embodiments, the multi-engine system can comprise more than two engines. In these embodiments, instead of considering the PMS of the non-idling engine, as described above, the engine having the PMS at the highest position can be considered as the reference for the flight rotation speed NL. As such, the highest values of the other engines' rotation speed is considered instead of the rotation speed NL2 of the second engine.

Example 2—Alternative Using Measured Rotation Speeds

In some embodiments, the low idle rotation speed is denoted NL_lowidle. For instance, NL_lowidle can be 50% of the flight rotation speed NL, i.e., 50% NL. The high idle rotation speed is denoted NL_highidle, such as 80% NL. The flight rotation speed NL can be denoted NL_flight or 100% NL for instance. In these embodiments, the rotation speed of the idling engine, e.g., the first engine, is denoted NL_idle and defined as a function of the second engine's rotation speed NL_nonidle to avoid dwelling in the placarded zone using an equation as per below:

$$NL\_idle = NL\_lowidle + k^*(\max(0, NL\_nonidle - NL\_lowidle)), \quad (1)$$

where constant k=(NL_highidle−NL_lowidle)/(NL_flight−NL_lowidle). For instance, with the exemplary values presented above, k can be given by (80−50)/(100−50)=30/50=0.6.

Figure 11A:
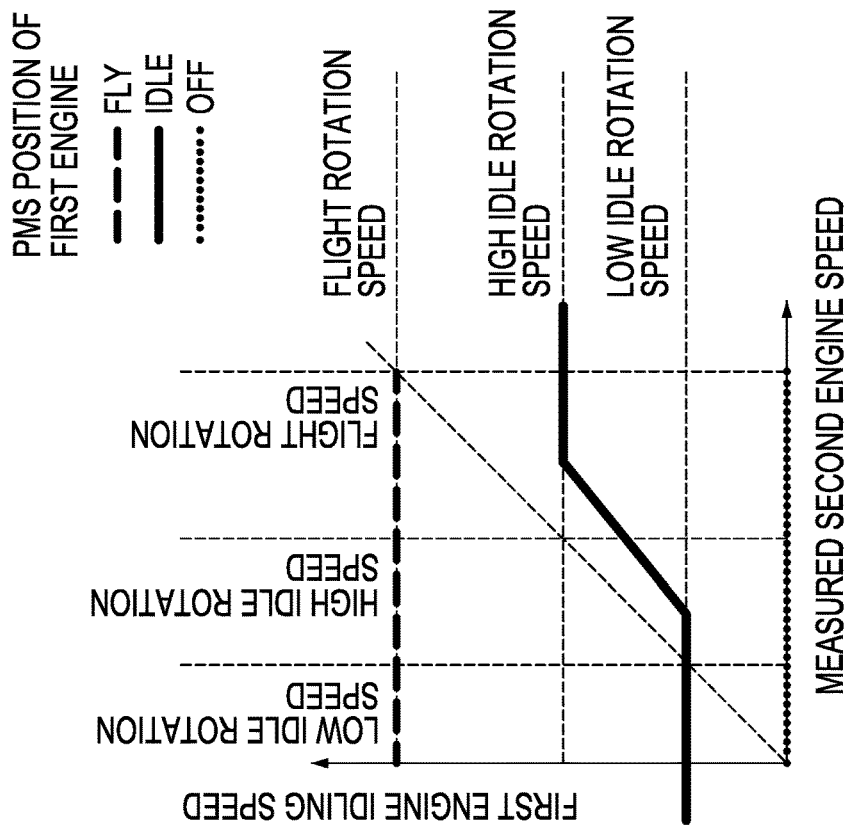
FIG. 11A is a graph showing idle rotation speed of the second engine as a function of the measured rotation speed of the first engine, in accordance with one or more embodiments.
Figure 11B:
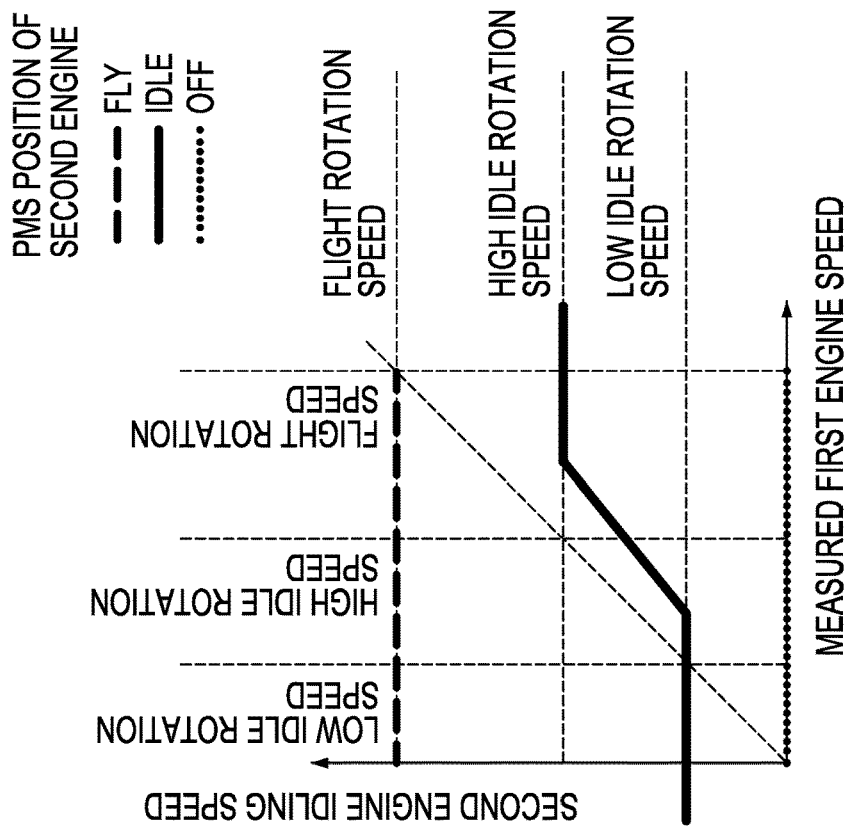
FIG. 11B is a graph showing idle rotation speed of the first engine as a function of the measured rotation speed of the second engine, in accordance with one or more embodiments.

In some embodiments, the non-idling engine's rotation speed NL_nonidle is 100% NL. In this case, the rotation speed NL_idle of the idling engine is given by 50+0.6*(max (0, 100−50))=80% NL. This technique can be advantageous for its simple implementation, it only requires the non-idling engine's rotation speed NL_nonidle as additional input, and only involves simple arithmetic operators for the idling engine's rotation speed to stay below or above the placarded zone during the operation of the multi-engine aircraft. This technique can ensure that the idling engine's rotation speed stays below the non-idling engine's rotation speed while being compatible with remote engine run-up inhibition by higher CLP value. However, this technique may present challenges in independently tuning the rotation speed's rates of change when the idling engine's rotation speed's reference toggles between the low idle rotation speed and the high idle rotation speed. In some embodiments, the idle rotation speed that is most suitable for the idling engine can be sensitive in case of rotor droop or overspeed and the other engine's rotation speed. There can be fluctuation around the idling rotation speed reference. This could be fixed by an additional logic that fix the idling engine's rotation speed reference to the high idle rotation speed once the transition from the second engine's PMS has switched from the IDLE position to the FLY position. In some embodiments, the idling engine's rotation speed NLidle is defined based on a two-dimensional look-up table function of the other engine measured speeds. This method can be simple and advantageous as the impact of any perturbation of the other engine measured speed (like rotor droop) for instance can be cancelled by setting properly constant NLidle speed zone close to reference NL speed target (low idle and flight). To an extrema, having all of the possible scenarios listed above and associated a reference NLidle to each scenario can be listed into a more complex multidimensional table to take into account other parameters affecting the idle rotation speed. FIGS. 11A and 11B show example relationships between the rotation speed of the idling engine as a function of the measured rotation speed of the non-idling engine. As can be appreciated, any one of the first and second engines can act as the idling or non-idling engine. For instance, in the example of FIG. 11A, the first engine is clutched to the load and its rotation speed is measured. The rotation speed of the second engine depends on its PMS position: when the PMS position of the second engine is at the fly position, its rotation speed is set to the flight rotation speed; when the PMS position of the second engine is at the off position, its rotation speed is set to a null rotation speed; and when the PMS position of the second engine is at the idle position, its rotation speed is given by the curve shown in solid line shown in FIG. 11A. As such, the rotation speed of the second engine is function of the rotation speed of the first engine as measured by some sensors in real time, for instance. In some other embodiments, the second engine can be clutched to the load. In these latter embodiments, the rotation speed of the first engine depends on its PMS position: when the PMS position of the first engine is at the flu position, its rotation speed is set to the flight rotation speed; when the PMS position of the first engine is at the off position, its rotation speed is set to a null rotation speed; and when the PMS position of the first engine is at the idle position, its rotation speed is given by the curve shown in solid line in FIG. 11B. As such, the rotation speed of the first engine is function of the rotation speed of the second engine as measured in real time.

The embodiments described in this document provide non-limiting examples of possible implementations of the present technology. Upon review of the present disclosure, a person of ordinary skill in the art will recognize that changes may be made to the embodiments described herein without departing from the scope of the present technology. There are different ways of increasing the rotation speed of a shaft of a turboshaft engine which involve increasing the power to the shaft. In combustible fuel gas turbine engines, for instance, the rotation speed can be increased by increasing fuel flow to the combustor sections, thereby increasing the energy in the working fluid which works against the turbine of the shaft. In hybrid electric/combustible fuel gas turbine engines, the rotation speed can be increased either by increasing the fuel flow to the combustor sections, or by delivering an increased amount of power to the shaft via an electric engine, or both. The methods and systems described herein can be used with any type of gas turbine engine including, but not limited to, turbofan engines, turboshaft engines, turboprop engines and the like. In embodiments where the engines are turboshaft engines, the multi-engine system can be provided in the form of a PT6T TWIN-PAC® (−9 Series, −6 Series, −3 Series) manufactured by Pratt & Whitney Canada Corp. The scalar values presented in this disclosure are meant to be examples only, as different values for the range of rotation speeds of the placarded zone and other parameters can be used in some other embodiments. Yet further modifications could be implemented by a person of ordinary skill in the art in view of the present disclosure, which modifications would be within the scope of the present technology.

The invention claimed is:

1. A method of operating a multi-engine system of a helicopter, the multi-engine system having a first turboshaft engine having a first shaft, a second turboshaft engine having a second shaft, and a gearbox having a clutch system clutching at least one of the first shaft and the second shaft to a load of the helicopter, the first and second shafts having a range of rotation speeds defined as a placarded zone, the method comprising:
rotating the first and second shafts at a first idle rotation speed below the placarded zone when the first and second shafts are clutched to the load;
increasing a rotation speed of the first shaft from the first idle rotation speed to a flight rotation speed, the flight rotation speed above the placarded zone;
unclutching the second shaft from the load during the increasing the rotation speed of the first shaft;
increasing a rotation speed of the second shaft to a second idle rotation speed when the second shaft is unclutched from the load, the second idle rotation speed above the placarded zone and below the flight rotation speed; and
maintaining the second shaft unclutched and maintaining the rotation speed of the second shaft to the second idle rotation speed until receiving a command to change an engine regime of the second turboshaft engine.

2. The method of claim 1 wherein the increasing the rotation speed of the first shaft includes increasing a first fuel flow to a first combustor section of the first turboshaft engine, and the increasing the rotation speed of the second shaft includes increasing a second fuel flow to a second combustor section of the second turboshaft engine.

3. The method of claim 1 wherein the increasing the rotation speed of the second shaft is simultaneous to the increasing the rotation speed of the first shaft.

4. The method of claim 1 wherein the increasing the rotation speed of the first shaft is performed progressively and in accordance with a first linear increase rate.

5. The method of claim 4 wherein the increasing the rotation speed of the second shaft is performed progressively and in accordance with a second linear increase rate, the first linear increase rate being steeper than the second linear increase rate.

6. The method of claim 5 wherein the first linear increase rate is twice the second linear increase rate.

7. The method of claim 5 wherein a difference between the first linear increase rate and the second linear increase rate causes the unclutching.

8. The method of claim 1 further comprising performing the method upon receiving a command to operate the first turboshaft engine in a flight regime and maintain the second turboshaft engine in an idle regime.

9. The method of claim 1 wherein the increasing the rotation speed of the second shaft is performed upon detecting that the second shaft has unclutched from the load.

10. A system for operating a multi-engine system of a helicopter, the multi-engine system having a first turboshaft engine having a first shaft, a second turboshaft engine having a second shaft, and a gearbox having a clutch system clutching at least one of the first shaft and the second shaft to a common load of the helicopter, the first and second shafts having a range of rotation speeds defined as a placarded zone, the system comprising:
a processing unit; and
a non-transitory storage medium having stored thereon program code executable by the processing unit for:
rotating the first and second shafts at a first idle rotation speed below the placarded zone when the first and second shafts are clutched to the load;
increasing a rotation speed of the first shaft from the first idle rotation speed to a flight rotation speed above the placarded zone;
unclutching the second shaft from the load during the increasing the rotation speed of the first shaft;
increasing a rotation speed of the second shaft to a second idle rotation speed when the second shaft is unclutched from the load, the second idle rotation speed above the placarded zone and below the flight rotation speed; and
maintaining the second shaft unclutched and maintaining the rotation speed of the second shaft to the second idle rotation speed until receiving a command to change an engine regime of the second turboshaft engine.

11. The system of claim 10 wherein the increasing the rotation speed of the first shaft includes increasing a first fuel flow to a first combustor section of the first turboshaft engine, and the increasing the rotation speed of the second shaft includes increasing a second fuel flow to a second combustor section of the second turboshaft engine.

12. The system of claim 10 wherein the increasing the rotation speed of the second shaft is simultaneous to the increasing the rotation speed of the first shaft.

13. The system of claim 10 wherein the increasing the rotation speed of the first shaft is performed progressively and in accordance with a first linear increase rate.

14. The system of claim 13 wherein the increasing the rotation speed of the second shaft is performed progressively and in accordance with a second linear increase rate, the first linear increase rate being steeper than the second linear increase rate.

15. The system of claim 14 wherein the first linear increase rate is twice the second linear increase rate.

16. The system of claim 14 wherein a difference between the first linear increase rate and the second linear increase rate causes the unclutching.

17. The system of claim 10 further comprising performing said rotating the first and second shafts, said increasing the rotation speed of the first shaft, said unclutching the second shaft from the load and said increasing the rotation speed of the second shaft upon receiving a command to operate the first turboshaft engine in a flight regime and maintain the second turboshaft engine in an idle regime.

18. The system of claim 10 wherein the increasing the rotation speed of the second shaft is performed upon detecting that the second shaft has unclutched from the load.

19. A method of operating a multi-engine system, the multi-engine system having a first engine having a first shaft, a second engine having a second shaft, and a gearbox having a clutch system clutching at least one of the first shaft and the second shaft to a load, the first and second shafts having a range of rotation speeds defined as a placarded zone, the method comprising:
- rotating the first and second shafts at a first idle rotation speed below the placarded zone when the first and second shafts are clutched to the load;
- increasing a rotation speed of the first shaft from the first idle rotation speed to a flight rotation speed above the placarded zone;
- unclutching the second shaft from the load during said increasing the rotation speed of the first shaft;
- increasing a rotation speed of the second shaft to a second idle rotation speed when the second shaft is unclutched from the load, the second idle rotation speed above the placarded zone and below the flight rotation speed; and
- maintaining the second shaft unclutched and maintaining the rotation speed of the second shaft to the second idle rotation speed until receiving a command to change an engine regime of the second turboshaft engine.

\* \* \* \* \*